(12) United States Patent
Fujishiro et al.

(10) Patent No.: US 10,681,629 B2
(45) Date of Patent: Jun. 9, 2020

(54) USER TERMINAL AND MOBILE COMMUNICATION METHOD

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 50 days.

(21) Appl. No.: 16/039,985

(22) Filed: Jul. 19, 2018

(65) Prior Publication Data
US 2018/0352508 A1 Dec. 6, 2018

Related U.S. Application Data

(63) Continuation of application No. PCT/JP2017/001797, filed on Jan. 19, 2017.
(Continued)

(51) Int. Cl.
| | |
|---|---|
| *H04W 48/20* | (2009.01) |
| *H04W 76/30* | (2018.01) |
| *H04W 76/10* | (2018.01) |
| *H04W 24/10* | (2009.01) |
| *H04W 36/00* | (2009.01) |
| *H04W 36/08* | (2009.01) |

(Continued)

(52) U.S. Cl.
CPC ........... *H04W 48/20* (2013.01); *H04W 24/10* (2013.01); *H04W 36/0083* (2013.01); *H04W 36/08* (2013.01); *H04W 48/08* (2013.01); *H04W 76/10* (2018.02); *H04W 76/30* (2018.02); *H04W 36/24* (2013.01); *H04W 48/16* (2013.01); *H04W 76/27* (2018.02)

(58) Field of Classification Search
None
See application file for complete search history.

(56) References Cited

U.S. PATENT DOCUMENTS

| | | |
|---|---|---|
| 9,363,799 B2 | 6/2016 | Park et al. |
| 9,794,876 B2 | 10/2017 | Choi et al. |
| (Continued) | | |

OTHER PUBLICATIONS

3GPP TR 23.770, "3rd Generation Partnership Project, Technical Specification Group Services and System Aspect, Study on System Impacts of Extended DRX Cycle for Power Consumption Optimization (Release 13)", Feb. 26, 2015.
(Continued)

*Primary Examiner* — Steven H Nguyen
(74) *Attorney, Agent, or Firm* — Studebaker & Brackett PC

(57) ABSTRACT

A user terminal comprises a controller configured to select a target cell as a serving cell from among cells operated in different frequencies; and a receiver configured to receive a reselection request signal from a current serving cell. The reselection request signal requesting a reselection of the target cell. The controller is configured to perform the reselection of the target cell toward a cell in target frequency and activate a predetermined timer, in response to the reception of the reselection request signal. The controller is further configured to use the cell in target frequency as the target cell during an activation of the predetermined timer. The controller is further configured to change an expiration time of the predetermined timer based on a moving speed of the user terminal.

2 Claims, 8 Drawing Sheets

Related U.S. Application Data

(60) Provisional application No. 62/281,446, filed on Jan. 21, 2016, provisional application No. 62/335,376, filed on May 12, 2016.

(51) Int. Cl.
*H04W 48/08* (2009.01)
*H04W 48/16* (2009.01)
*H04W 36/24* (2009.01)
*H04W 76/27* (2018.01)

(56) References Cited

U.S. PATENT DOCUMENTS

| | | | |
|---|---|---|---|
| 9,826,526 B2 | 11/2017 | Oizumi et al. | |
| 9,974,058 B2 | 5/2018 | Maattanen et al. | |
| 10,244,449 B2 | 3/2019 | Fujishiro et al. | |
| 2007/0015530 A1 | 1/2007 | Ding | |
| 2012/0082051 A1 | 4/2012 | Kim et al. | |
| 2012/0314680 A1 | 12/2012 | Kela | |
| 2013/0343355 A1 | 12/2013 | Barbieri et al. | |
| 2014/0024382 A1* | 1/2014 | Zou | H04W 16/08 455/445 |
| 2014/0329529 A1 | 11/2014 | Jung et al. | |
| 2016/0242176 A1 | 8/2016 | Sun et al. | |
| 2017/0164419 A1 | 6/2017 | Kim | |
| 2018/0220330 A1* | 8/2018 | Van Der Velde | H04W 24/08 |
| 2018/0262953 A1* | 9/2018 | Ku | H04W 88/02 |

OTHER PUBLICATIONS

Intel Corporation, "Uplink transmission with LBT", 3GPP TSG-RAN WG2 #89bis, R2-151102, Apr. 20-24, 2015, Bratislava, Slovakia, 6 pages.

Kyocera, "Discontinuous Transmission Design for LAA", 3GPP TSG RAN WG1 Meeting #81, R1-153102, May 25-29, 2015, Fukuoka, Japan, 4 pages.

ETRI, "Discussion on UL grant for LAA", 3GPP TSG RAN WG1 Meeting #80bis, R1-152095, Apr. 20-24, 2015, Belgrade, Serbia, 6 pages.

NTT Docomo, Inc., "Discussion on issues related to UL transmission in LAA", 3GPP TSG RAN WG1 Meeting #80bis, R1-151958, Apr. 20-24, 2015, Belgrade, Serbia, 6 pages.

3rd Generation Partnership Project; Technical Specification Group Radio Access Network; Evolved Universal Terrestrial Radio Access (E-UTRA); User Equipment (UE) procedures in idle mode; 3GPP TS 36.304 V12.4.0; Mar. 2015; pp. 1-38; Release 12; 3GPP Organizational Partners.

ZTE et al.; Introduction of load redistribution in RRC_IDLE; 3GPP TSG-RAN WG2 Meeting # 92; R2-157144; Nov. 16-20, 2015; 6 pages; Anaheim, U.S.A.

ZTE; Introduction of load redistribution in RRC_IDLE; 3GPP TSG-RAN WG2 Meeting # 92; R2-156627; Nov. 16-20, 2015; 6 pages; Anaheim, U.S.A.

TSG RAN WG2; RAN2 agreed CRs on Introduction of Multicarrier Load Distribution of UEs in LTE; 3GPP TSG RAN Meeting #70; RP-152075; Dec. 7-10, 2015; 2 pages; Sitges, Spain.

ZTE; Introduction of load redistribution in RRC_IDLE; 3GPP TSG-RAN WG2 Meeting # 92; R2-157121; Nov. 16-20, 2015; 2 pages; Anaheim, U.S.A.

\* cited by examiner

USER TERMINAL AND MOBILE COMMUNICATION METHOD

CROSS-REFERENCE TO RELATED APPLICATION

The present application is a continuation based on PCT Application No. PCT/JP2017/001797 filed on Jan. 19, 2017, which claims the benefit of U.S. Provisional Application No. 62/281,446 (filed on Jan. 21, 2016) and U.S. Provisional Application No. 62/335,376 (filed on May 12, 2016). The content of which is incorporated by reference herein in their entirety.

FIELD

The present invention relates to a user terminal and a mobile communication method for selecting, from a plurality of cells operated at different frequencies, a target cell to be used as a serving cell.

BACKGROUND

In the 3rd generation partnership project (3GPP) which is a standardization project of a mobile communication system, a technology for selecting, from a plurality of cells operated at different frequencies, a target cell to be used as a serving cell has been proposed.

Specifically, when start conditions are satisfied, the user terminal measures quality of neighboring cells adjacent to a current serving cell and selects, from cells satisfying selection conditions, the target cell to be used as the serving cell.

SUMMARY

A first aspect is a user terminal comprising: a controller configured to select a target cell as a serving cell from among cells operated in different frequencies; and a receiver configured to receive a reselection request signal from a current serving cell. The reselection request signal requesting a reselection of the target cell. The controller is configured to perform the reselection of the target cell toward a cell in target frequency and activate a predetermined timer, in response to the reception of the reselection request signal. The controller is further configured to use the cell in target frequency as the target cell during an activation of the predetermined timer. The controller is further configured to change an expiration time of the predetermined timer based on a moving speed of the user terminal.

A second aspect is a user terminal comprising: a controller configured to select a target cell as a serving cell from among cells operated in different frequencies; and a receiver configured to receive a reselection request signal from a current serving cell. The reselection request signal requesting a reselection of the target cell. The controller is configured to perform the reselection of the target cell toward a cell in target frequency and activate a predetermined timer, in response to the reception of the reselection request signal. The controller is further configured to use the cell in target frequency as the target cell during an activation of the predetermined timer. The controller is further configured to change an expiration time of the predetermined timer based on a moving speed of the user terminal.

A third aspect is a user terminal comprising: a controller configured to select a target cell as a serving cell from a plurality of cells operated at different frequencies; and a receiver configured to receive, from a current serving cell, a reselection request signal requesting a reselection of the target cell. The controller is further configured to perform the reselection of the target cell to a cell in target frequency and activate a predetermined timer, in response to the reception of the reselection request signal. The controller is further configured to use the cell in target frequency as the target cell during an activation of the predetermined timer. The controller is further configured to stop the predetermined timer upon receiving a stop request signal requesting a stop of the predetermined timer.

A fourth aspect is a user terminal comprising: a controller configured to select a target cell as a serving cell from a plurality of cells operated at different frequencies; and a receiver configured to receive, from a current serving cell, a reselection request signal requesting a reselection of the target cell. The controller is further configured to perform the reselection of the target cell to a cell of a target frequency and activate a predetermined timer, in response to the reception of the reselection request signal. The controller is further configured to use the cell in target frequency as the target cell during an activation of the predetermined timer. The controller is further configured to perform the reselection of the target cell toward a cell in inter-frequency cell in response to a reception of an inter-frequency reselection request signal during the activation of the predetermined timer.

A fifth aspect is a mobile communication method comprising: a step A of selecting a target cell as a serving cell from a plurality of cells operated at different frequencies; a step B of receiving, from a current serving cell, a reselection request signal requesting a reselection of the target cell; a step C of performing the reselection of the target cell toward a cell in target frequency and activating a predetermined timer, in response to the reception of the reselection request signal; a step D of using the cell in target frequency as the target cell during an activation of the predetermined timer; and a step E of changing an expiration time of the predetermined timer based on a moving speed of the user terminal.

A sixth aspect is a mobile communication method comprising: a step A of selecting a target cell as a serving cell from a plurality of cells operated at different frequencies; a step B of receiving, from a current serving cell, a reselection request signal requesting a reselection of the target cell; a step C of performing the reselection of the target cell toward a cell in target frequency and activating a predetermined timer, in response to the reception of the reselection request signal; a step D of using the cell in target frequency as the target cell during an activation of the predetermined timer; and a step E of stopping the predetermined timer upon receiving a stop request signal requesting a stop of the predetermined timer.

A seventh aspect is a mobile communication method comprising: a step A of selecting a target cell as a serving cell from a plurality of cells operated at different frequencies; a step B of receiving, from a current serving cell, a reselection request signal requesting a reselection of the target cell; a step C of performing the reselection of the target cell toward a cell in target frequency and activating a predetermined timer, in response to the reception of the reselection request signal; a step D of using the cell in target frequency as the target cell during an activation of the predetermined timer; and a step E of performing the reselection of the target cell toward a cell in inter-frequency in response to a reception of an inter-frequency reselection request signal during the activation of the predetermined timer.

DESCRIPTION OF EMBODIMENTS

Figure 1:
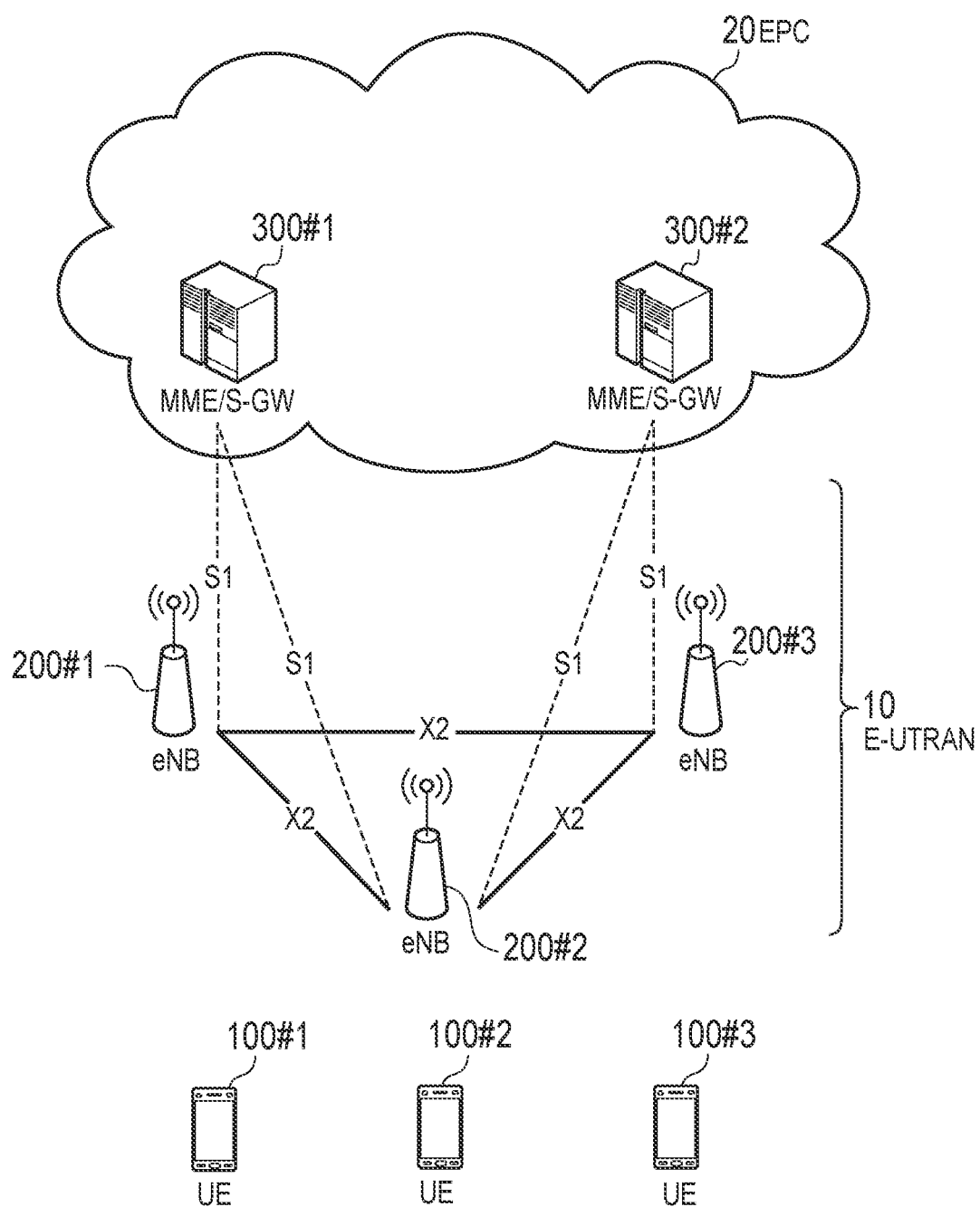
FIG. 1 is a configuration diagram of an LTE system according to an embodiment.

Hereinafter, a mobile communication system according to an embodiment will be described with reference to the drawings. It is noted to be that in the following description of the drawings, the same or similar reference numerals are attached to the same or similar parts.

However, it is to be noted that the drawings are schematic, and ratios of each dimension and the like may be different from actual ones in some cases. Therefore, concrete dimensions and the like should be judged with reference to the following explanation. In addition, it is a matter of course that portions in which relationships and proportions between the dimensions are different between drawings are included.

[Overview of Disclosure]

In the mobile communication system mentioned in the background art, a selection of a target cell used as a serving cell is performed based on quality of neighboring cells. Therefore, there is a high probability that user terminals located at a geographically close position select the same cell as the target cell. In addition, there is a high possibility that user terminals may be distributed to be geographically biased. That is, there is a possibility that cells in which user terminals are used as serving cells are biased in the same cell, and a load distribution to each cell may not be appropriately performed.

A user terminal according to the overview of the disclosure comprises: a controller that selects a target cell as a serving cell from a plurality of cells operated at different frequencies; and a receiver that receives, from a current service cell, a reselection request signal for requesting a reselection of the target cell. The controller performs the reselection of the target cell to toward a cell in target frequency and activates a predetermined timer, in response to the reception of the reselection request signal. The controller uses the cell in target frequency as the target cell during an activation of the predetermined timer.

According to such a configuration, first, in the user terminal according to overview of the disclosure, the controller reselects the target cell toward the cell in target frequency in response to the reception of the reselection request signal. Therefore, it is possible to appropriately perform the load distribution to each cell. In other words, the user terminal in an RRC idle state can be appropriately distributed to each cell. Second, in the user terminal according to the overview of the disclosure, the controller activates the predetermined timer in response to the reception of the reselection request signal, and the controller uses the cell in target frequency as the target cell during the activation of the predetermined timer. Therefore, after the reselection of the target cell is performed in response to the reception of the reselection request signal, a ping-pong effect between the cell of a source frequency and the cell in target frequency is suppressed.

In addition, under the above-mentioned premise, the user terminal according to the overview of the disclosure has the following configuration.

Under the above-mentioned premise, the controller changes an expiration time of the predetermined timer based on a moving speed of the user terminal. Alternatively, under the above-mentioned premise, the controller stops the predetermined timer when receiving a stop request signal that requests to stop the predetermined timer. Alternatively, the controller reselects the target cell to cells with different frequencies in response to a reception of an inter-frequency reselection request signal during the activation of the predetermined timer.

Therefore, during the activation of the predetermined timer, when the user terminal moves from a first area in which the user terminal is located when receiving the reselection request signal to a second area in which a high priority cell having priority higher than the cell in target frequency is provided, it is possible to suppress the situation in which the high priority cell is not selected as the target cell until the predetermined timer expires.

A user terminal according to the overview of the disclosure includes: a controller that selects a target cell as a serving cell from a plurality of cells operated at different frequencies; and a receiver that receives, from a current service cell, a reselection request signal for requesting a reselection of the target cell. The controller performs the reselection of the target cell toward a cell in target frequency and activates the predetermined timer, in response to the reception of the reselection request signal. The controller uses the cell in target frequency as the target cell during an activation of the predetermined timer. The controller changes the expiration time of the predetermined timer based on the moving speed of the user terminal.

Hereinafter, the embodiments will be described by taking an LTE system based on the 3GPP standard as an example as a mobile communication system.

(System Configuration)

The system configuration of an LTE system according to the embodiments will be described. FIG. 1 is a configuration diagram of the LTE system according to the embodiments.

As illustrated in FIG. 1, the LTE system according to the embodiments includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device. The UE 100 performs radio communication with a cell formed by an eNB 200 (a serving cell when the UE 100 is in a RRC connected state). The configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 forms a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs various mobility controls and the like, for the UE 100. The S-GW performs control to transfer user data. The MME/S-GW 300 is connected to the eNB 200 via an S1 interface. The E-UTRAN 10 and the EPC 20 configure a network of the LTE system.

Figure 2:
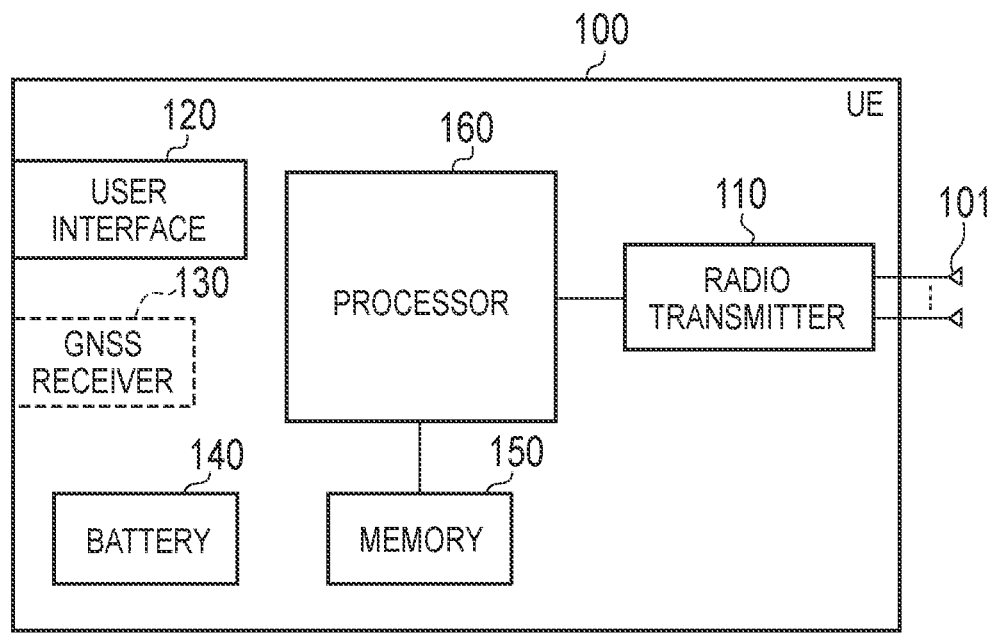
FIG. 2 is a block diagram of a UE 100 according to the embodiment.

FIG. 2 is a block diagram of the UE 100. As illustrated in FIG. 2, the UE 100 includes a plurality of antennas 101, a radio transceiver 110, a user interface 120, GNSS (Global Navigation Satellite System) receiver 130, a battery 140, a memory 150, and a processor 160. The memory 150 and the processor 160 constitute a controller. The radio transceiver 110 and the processor 160 constitute a transmitter and a receiver. The UE 100 may not have the GNSS receiver 130. Furthermore, the memory 150 may be integrally formed with the processor 160, and this set (that is, a chip set) may be called a processor.

The antenna 101 and the radio transceiver 110 are used to transmit and receive a radio signal. The radio transceiver 110 converts a baseband signal (a transmission signal) output from the processor 160 into the radio signal. The radio transceiver transmits the radio signal from the antenna 101. Furthermore, the radio transceiver 110 converts a radio signal (a reception signal) received by the antenna 101 into the baseband signal. The radio transceiver 110 outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100. The GNSS receiver outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor and a CPU (Central Processing Unit). The baseband processor performs modulation and demodulation, encoding and decoding and the like on the baseband signal. The CPU performs various processes by executing the program stored in the memory 150. The processor 160 may further include a codec that performs encoding and decoding on sound and video signals. The processor 160 executes various processes and various communication protocols described later.

Figure 3:
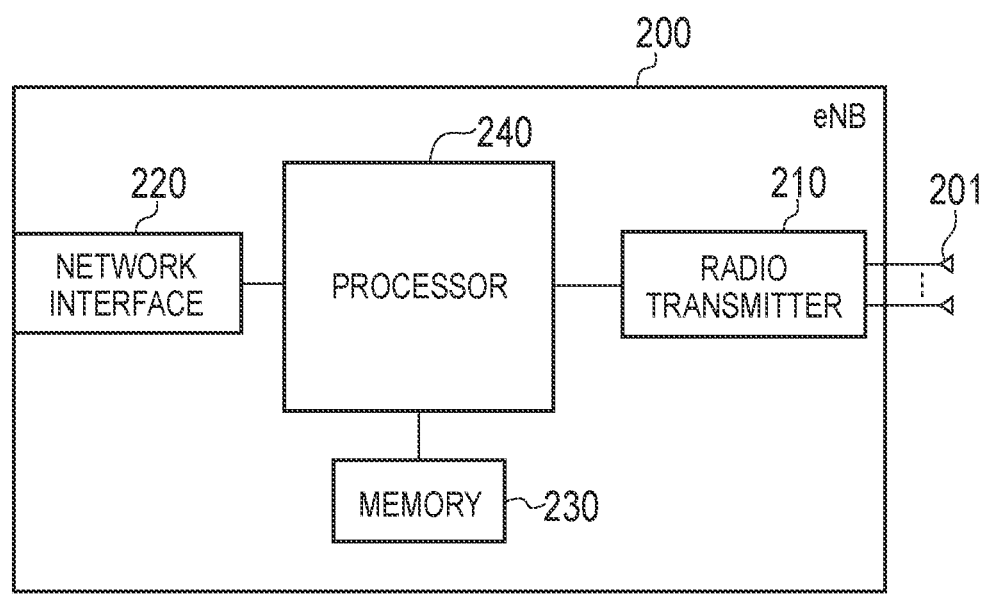
FIG. 3 is a block diagram of an eNB 200 according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 (and/or the network interface 220) and the processor 240 constitute a transmitter and a receiver. Furthermore, the memory 230 may be integrally formed with the processor 240, and this set (that is, a chip set) may be called a processor.

The antenna 201 and the radio transceiver 210 are used to transmit and receive a radio signal. The radio transceiver 210 converts a baseband signal (a transmission signal) output from the processor 240 into the radio signal. The radio transceiver 210 transmits the radio signal from the antenna 201. Furthermore, the radio transceiver 210 converts a radio signal (a reception signal) received by the antenna 201 into the baseband signal. The radio transceiver 210 outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor and a CPU. The baseband processor performs modulation and demodulation, encoding and decoding and the like on the baseband signal. The CPU performs various processes by executing the program stored in the memory 230. The processor 240 executes various processes and various communication protocols described later.

Figure 4:
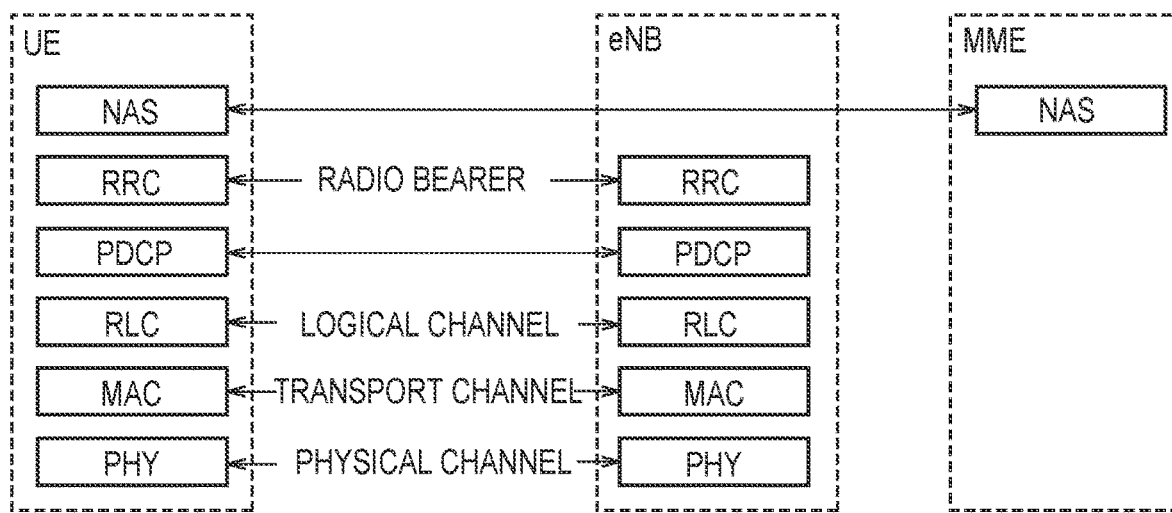
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model. The layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, a retransmission process and the like by hybrid ARQ (HARQ), a random access procedure and the like. Between the MAC layer of the UE 100 and the MAC layer of the eNB 200, user data and control information are transmitted via a transport channel. The MAC layer of the eNB 200 includes a transport format of an uplink and a downlink (a transport block size, a modulation and coding scheme) and a scheduler that decides (schedules) an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and control information are transmitted via a logical channel.

The PDCP layer performs header compression and decompression, and encryption and decryption. In the PDCP layer, a transmitting entity for transmitting data units (PDCP PDUs) and/or a receiving entity for receiving data units (PDCP PDUs) are formed.

The RRC layer is defined only in a control plane handling control information. Between the RRC layer of the UE 100 and the RRC layer of the eNB 200, control information (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state. when the connection (the RRC connection) is not established between the RRC of the UE 100 and the RRC of the eNB 200, the UE 100 is in an RRC idle state.

NAS (Non-Access Stratum) layer positioned above the RRC layer performs session management, mobility management and the like.

Figure 5:
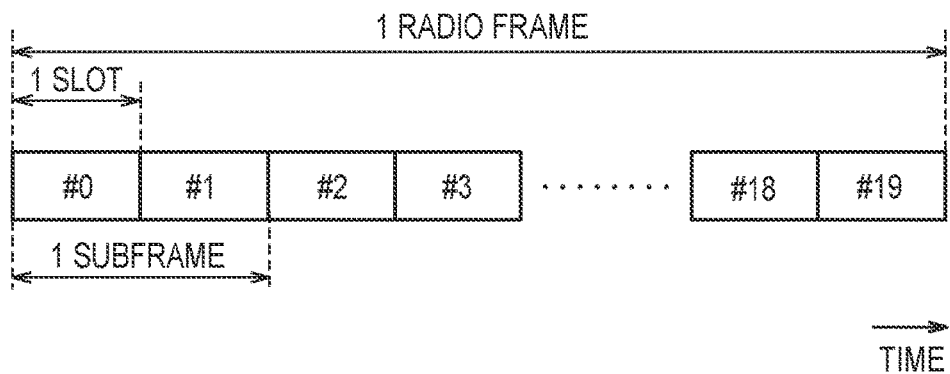
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiplexing Access) is employed in a downlink. In the LTE system, SC-FDMA (Single Carrier Frequency Division Multiple Access) is employed in an uplink.

As illustrated in FIG. 5, the radio frame is constituted by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction. Each subframe includes a plurality of symbols in the time direction. Each resource block includes a plurality of subcarriers in the frequency direction. A resource element (RE) is constituted by one subcarrier and one symbol. Among radio resources (time frequency resources) allocated to the UE 100, a frequency resource is identified by a resource block and a time resource is identified by a subframe (or slot).

(Application Scene)

Figure 6:
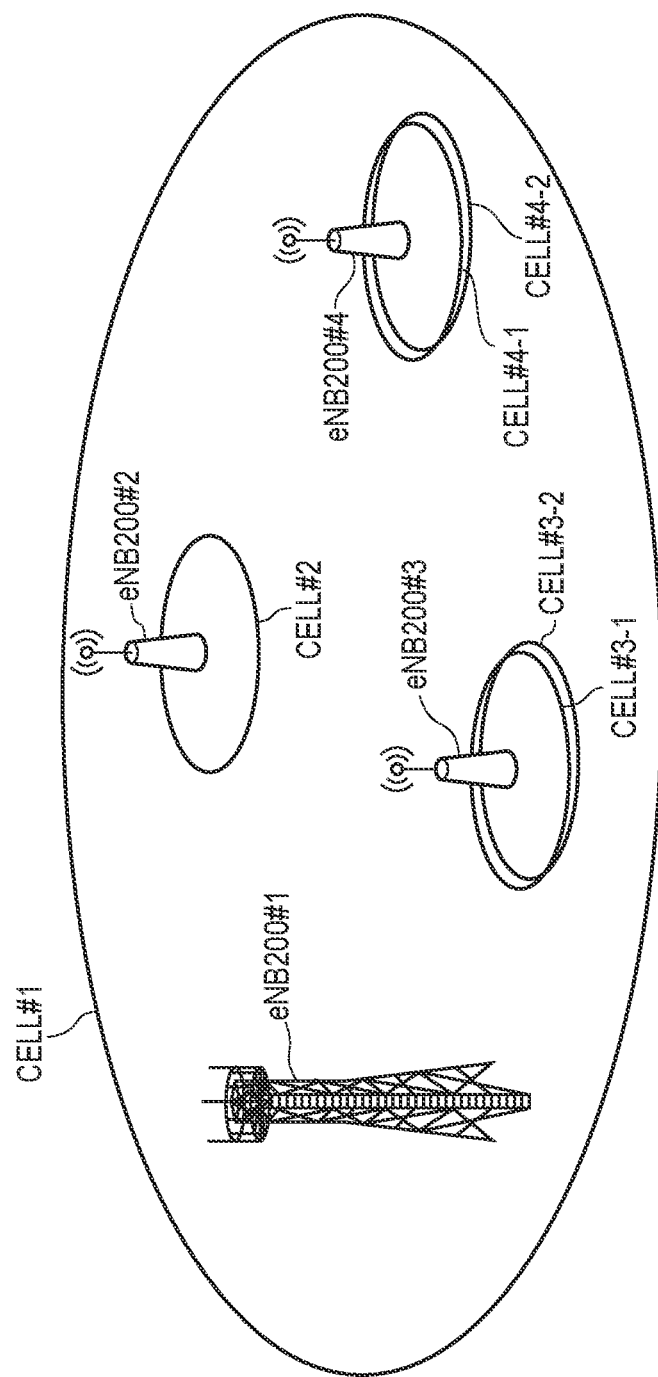
FIG. 6 is a diagram for explaining an application scene according to an embodiment.

Hereinafter, an application scene will be described below. FIG. 6 is a diagram for explaining an application scene according to the embodiment.

As shown in FIG. 6, a plurality of eNBs 200 (for example, eNB 200#1, eNB 200#2, eNB 200#3, and eNB 200#4) are provided. The eNB 200#1 has a cell#1 as a radio communication area. The eNB 200#2 has a cell#2 as the radio communication area. The eNB 200#3 has a cell#3-1 and a cell#3-2 as the radio communication area. The eNB 200#4 has a cell#4-1 and a cell#4-2 as the radio communication area.

The cell#2, cell#3-1, cell#3-2, cell#4-1 and cell#4-2 overlap the cell#1. Each cell is operated at different frequencies. Priorities are defined for frequencies at which each cell is operated. The correspondence between the frequency and the priority is included in system information (system information block (SIB)) broadcast from the eNB 200.

Under the premise, a UE 100 selects, from a plurality of cells operated at different frequencies, a target cell used as a serving cell. Specifically, the UE 100 measures quality of neighboring cells adjacent to the current serving cell when start conditions are satisfied. Then, the UE 100 selects, from cells satisfying selection conditions, a target cell to be used as a serving cell.

First, the start conditions are as follows.

(A1) A frequency having priority higher than that of the frequency of the current serving cell The UE 100 always measures quality of a frequency having high priority.

(A2) A frequency having priority equal to or lower than that of the frequency of the current serving cell When the quality of the current serving cell falls below a predetermined threshold value, the UE 100 measures quality of a frequency having equal priority or lower priority.

Second, the start conditions are as follows.

(B1) Priorities of frequencies of neighboring cells are higher than the priority of the current serving cell The UE 100 selects, as a target cell, a cell that satisfies the relationship of Squal>$Thresh_{X,HighQ}$ over a predetermined period ($Treselection_{RAT}$) or a cell that satisfies the relationship of Srxlev>$Thresh_{X,HighP}$ over a predetermined period ($Treselection_{RAT}$). In such a case, criteria that neighboring cells should satisfy is sometimes called "S-criteria".

However, the Squal represents a cell selection quality level. The Squal is calculated by Squal=$Q_{qualmeas}$−($Q_{qualmin}$+$Q_{qualminoffset}$)−$Qoffset_{temp}$. The $Q_{qualmeas}$ is a quality level (RSRQ) of neighbor cells. The $Q_{qualmin}$ is a minimum request quality level. The $Q_{qualminoffset}$ is neighboring a predetermined offset normally applied to neighboring cells. The $Qoffset_{temp}$ is an offset that is temporarily applied to neighboring cells. The $Thresh_{X,HighQ}$ is a predetermined threshold value.

The Srxlev represents the cell selection reception level. The Srxlev is calculated by Srxlev=$Q_{rxlevmeas}$−($Q_{rxlevmin}$−$Q_{rxlevminoffset}$)−Pcompensation−$Qoffset_{temp}$. The $Q_{rxlevmeas}$ is a reception level (RSRP) of neighboring cells. The $Q_{rxlevmin}$ is a minimum request reception level. The $Q_{rxlevminoffset}$ is a predetermined offset normally applied to neighboring cells. The Pcompensation is a parameter related to uplink capability. The $Qoffset_{temp}$ is an offset that is temporarily applied to neighboring cells. The $Thresh_{X,HighP}$ is a predetermined threshold value.

(B2) Priorities of frequencies of neighboring cells are equal to the priority of the current serving cell The UE 100 calculates a ranking $R_s$ of the current serving cell and a ranking $R_n$ of neighboring cells. The UE 100 selects as a target cell, a cell having the ranking $R_n$ higher than the $R_s$ over a predetermined period ($Treselection_{RAT}$). In such a case, criteria that neighboring cells should satisfy is sometimes called "R-criteria".

However, the $R_s$ is calculated by $R_s$=$Q_{meas, s}$+$Q_{Hyst}$−$Qoffset_{temp}$. The $R_n$ is calculated by $R_n$=$Q_{meas, n}$−$Qoffset$−$Qoffset_{temp}$. The $Q_{meas, s}$ is a reception level (RSRP) of the current serving cell. The $Q_{meas, n}$ is the reception level (RSRP) of the neighboring cells. The $Q_{Hyst}$ is a hysteresis value for facilitating the reselection of the current serving cell as the target cell. The $Qoffset_{temp}$ is an offset that is temporarily applied to serving cells and neighboring cells.

(B3) Priorities of frequencies of neighboring cells are lower than the priority of the current serving cell The UE 100 selects a target cell from neighboring cells by the same manner as the above B1 under the premise that Squal<$Thresh_{Serving,LowQ}$ is satisfied over a predetermined period ($Treselection_{RAT}$) or a cell that Srxlev<$Thresh_{Serving,LowP}$ is satisfied over a predetermined period ($Treselection_{RAT}$).

The $Thresh_{Serving,LowQ}$ and the $Thresh_{Serving,LowP}$ are predetermined threshold values like the $Thresh_{X,HighQ}$ and the $Thresh_{X,HighP}$.

Various parameters used for the selection of the target cell are included in the system information (system information block (SIB)) broadcast from the eNB 200. Various parameters include priority (cellReselectionPriority) of frequency, predetermined period ($Treselection_{RAT}$), various offsets ($Q_{qualminoffset}$, $Q_{rxlevminoffset}$, $Qoffset_{temp}$, $Q_{Hyst}$, and Qoffset), and various threshold values ($Thresh_{X,HighQ}$, $Thresh_{X,HighP}$, $Thresh_{Serving,LowQ}$, and $Thresh_{Serving,LowP}$).

According to the embodiment, the UE (controller) 100 selects, from the plurality of cells operated at different frequencies, the target cell used as the serving cell. Specifically, even when the quality of the current serving cell satisfies the predetermined quality criteria, the UE 100 (controller) measures the quality of the neighboring cells adjacent to the current serving cell at a predetermined timing. "Satisfying the predetermined quality criteria" means that the above-mentioned start conditions are not satisfied. In detail, the predetermined quality criteria are the condition that the quality of the current serving cell does not fall below the predetermined threshold value as shown in the above A2.

In other words, the UE 100 (controller) according to the embodiment is in principle configured not to start the quality measurement of the neighboring cells adjacent to the current serving cell, when the quality of the current serving cell satisfies the predetermined quality criteria. However, it is to be noted that UE 100 (controller) exceptionally starts the quality measurement of the neighboring cells based on the system information received from the current serving cell, as described below.

The UE 100 (controller) specifies the predetermined timing based on the system information (system information block (SIB)) received from the current serving cell. The predetermined timing means the timing at which the quality measurement of the neighboring cells is started as the target cell is selected.

The system information may also mean that the quality measurement of the neighboring cells is immediately started. In such a case, the UE 100 (controller) specifies, as the predetermined timing, the timing at which the system information is received, and starts the quality measurement of the neighboring cells in response to the reception of the system information.

The system information may include a subframe number at which the quality measurement of the neighboring cells is to be started. The UE 100 (controller) specifies, as a predetermined timing, the subframe number included in the system information, and starts the quality measurement of the neighboring cells at the specified subframe number.

The system information may include information indicating a period of a predetermined timing. For example, the system information includes a timer value to be set in a timer which is activated at the timing at which the quality measurement of the neighboring cells is ended. The UE 100 (controller) specifies, as the predetermined timing, the timing at which the timer in which a timer value is set expires, and starts the quality measurement of the neighboring cells at the specified timing.

In the case where the system information includes information indicating the period of the predetermined timing, the UE 100 (controller) may correct the period of the predetermined timing based on a value unique to the UE 100. The value unique to the UE 100 may be, for example, the subframe number for receiving the system information, or an identifier (UE-ID) of the UE 100. The UE 100 (controller) sets a value obtained by "timer value×UE-ID" in the timer. The UE 100 starts the quality measurement of the neighboring cells at the timing at which the timer expires.

The system information may include a threshold value to be compared with a random number generated by the UE 100 (controller). The UE 100 (controller) measures the quality of the neighboring cells based on the comparison result between the random number and the threshold value at the predetermined timing. For example, the UE 100 (controller) starts the quality measurement of the neighboring cells at the predetermined timing at which the conditions that the random number is larger than the threshold value or the random number is smaller than the threshold value are satisfied.

(Mobile Communication Method)

Figure 7:
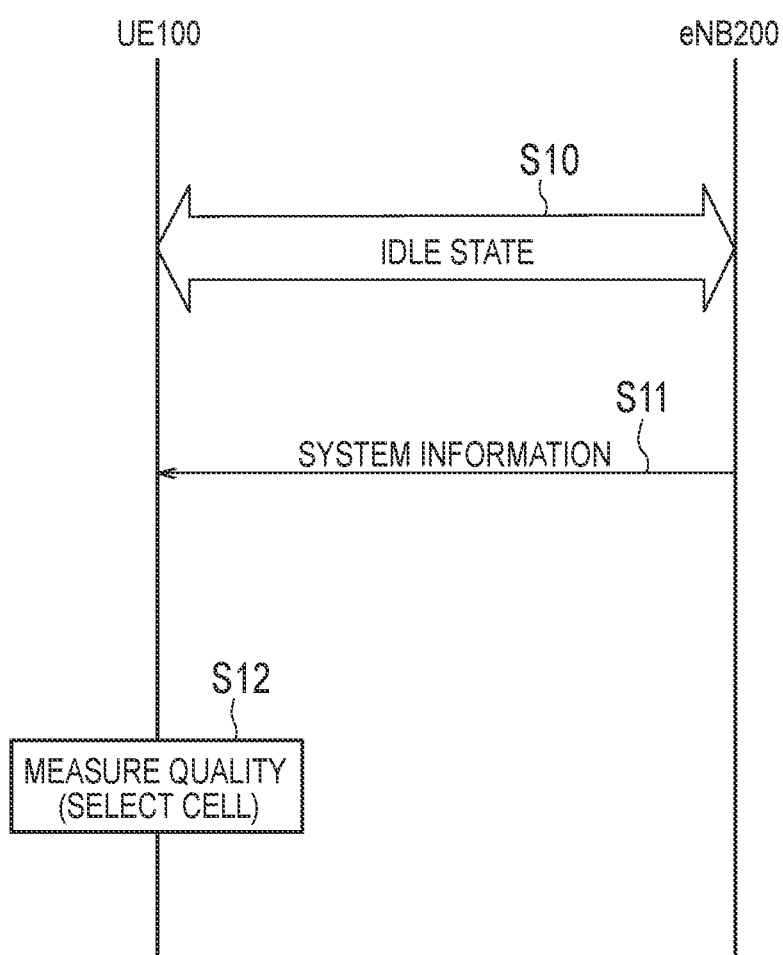
FIG. 7 is a sequence diagram showing a mobile communication method according to an embodiment.

A mobile communication method according to an embodiment will be described. FIG. 7 is a sequence diagram showing a mobile communication method according to an embodiment.

As shown in FIG. 7, in step S10, the UE 100 is in an RRC idle state.

In step S11, the UE 100 receives the system information (system information block (SIB)) broadcast from the eNB 200 (current serving cell).

In step S12, even when the quality of the current serving cell satisfies the predetermined quality criteria, the UE 100 (controller) measures the quality of the neighboring cells adjacent to the current serving cell at a predetermined timing. The UE 100 (controller) specifies the predetermined timing based on the system information (system information block (SIB)).

Even when the quality of the current serving cell satisfies the predetermined quality criteria, the UE 100 (controller) according to the embodiment measures the quality of the neighboring cells adjacent to the current serving cell at the predetermined timing. That is, even in the UEs 100 located at a geographically close position, the timing at which the quality measurement of the neighboring cells is started as the target cell is selected is temporally discrete. Therefore, it is possible to appropriately perform the load distribution to each cell. In other words, the UE 100 in the RRC idle state can be appropriately distributed to each cell.

Modified Example 1

Modified Example 1 of the embodiment will be described. Differences from the embodiment will be mainly described.

Specifically, according to the embodiment, even when a quality of a current serving cell satisfies predetermined quality criteria, a UE 100 measures a quality of the neighboring cells adjacent to the current serving cell at a predetermined timing. On the other hand, in Modified Example 1, as shown in (B1) to (B3) described in the embodiment, the UE 100 (controller) selects, from cells having quality satisfying the predetermined quality criteria (S-criteria and R-criteria), a target cell used as a serving cell. The UE 100 (controller) selects a target cell based on values having randomness, in the selection of the target cell.

The values having randomness may not be values common to all the UEs 100 located in the current serving cell. For example, the values having randomness mean one or more value selected from an identifier UE-ID allocated to the UE 100, a random number generated by the UE 100 (controller), and an access class (AC) related to an access restriction of the UE 100.

The UE 100 (controller) may also correct qualities (for example, Squal, Srxlev, $Q_{meas,s}$, and $Q_{meas,n}$) based on values (for example, UE-ID, random number, AC) having randomness. For example, as the quality correction method, a new value may be defined as various offsets $Q_{qualminoffset}$, $Q_{rxlevminoffset}$, $Qoffset_{temp}$, $Q_{Hyst}$, Qoffset), or a new offset may be introduced. Various offsets are calculated, for example, by offset=(default offset)×(UE-ID÷n). n is a predetermined value or a value broadcast from the serving cell.

The UE 100 (controller) may also correct a priority (cellReselectionPriority) of a frequency at which a plurality of cells each are operated, based on the values (for example, UE-ID, random number, AC) having randomness.

The UE 100 (controller) may select the target cell from the cells having the quality satisfying the predetermined quality criteria (S-criteria or R-criteria), based on the values (for example, UE-ID, random number, AC) having randomness. In other words, the UE 100 (controller) specifies cells having the quality satisfying the predetermined quality criteria (S-criteria or R-criteria) and selects, from the specified cells (selection candidate cells), the target cell based on the values having randomness. For example, the UE 100 (controller) corrects the ranking of the selection candidate cells based on the values having randomness.

The UE 100 (controller) may select a target cell from cells operated at a frequency having the same priority as the frequency of the current serving cell, based on the values having randomness. The frequency having the same priority as the frequency of the current serving cell may be the same frequency as the frequency of the current serving cell. The frequency having the same priority as the frequency of the current serving cell may also be the different frequency from the frequency of the current serving cell. In other words, the UE 100 (controller) specifies a cell that satisfies the above-mentioned conditions, and selects, from the specified cells (selection candidate cells), the target cell based on the values having randomness. For example, the UE 100 (controller) corrects the ranking of the selection candidate cells based on the values having randomness.

The UE 100 (controller) may select, from cells that have the quality within the predetermined range, target cells based on the values having randomness. The predetermined range is preferably included in the system information (system information block (SIB)) broadcast from the current serving cell. In other words, the UE 100 (controller) may specify cells that have a quality within a predetermined range, and select, from the specified cells (selection candidate cells), target cells based on the values having randomness. The quality within the predetermined range may be quality within a predetermined range (for example, within 5 dB and the like) that is no great difference from best quality. The predetermined quality may be a quality of a cell having a ranking of a predetermined range (for example, top 3) counted from the top of the ranking. For example, the UE 100 (controller) corrects the ranking of the selection candidate cells based on the values having randomness.

The ranking of the cells can be corrected, for example, as follows. When a random number is used as the value having randomness, the ranking of the cells is changed depending on a function of Roundup {RAND×(selection candidate cell number)}. When the UE-ID is used as the value having randomness, a target cell having the highest ranking is selected from the selection candidate cells that satisfy the relationship of (UE ID) mod (Cell ID)≥n. n is a predetermined value or a value broadcast from the serving cell.

(Mobile Communication Method)

Figure 8:
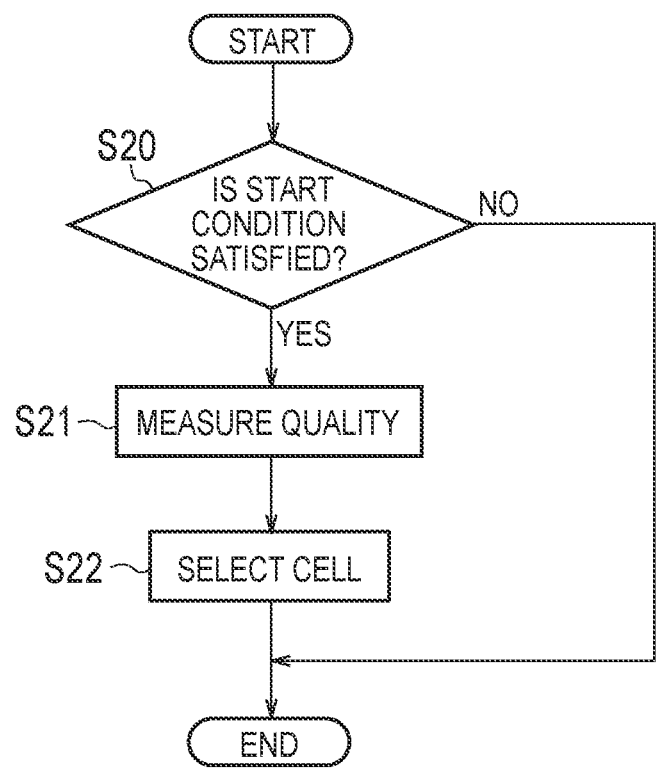
FIG. 8 is a flow chart showing a mobile communication method according to Modified Example 1.

The mobile communication method according to Modified Example 1 will be described. FIG. 8 is a flow chart showing the mobile communication method according to Modified Example 1. It is to be noted that the flow shown in FIG. 8 is performed by a UE 100.

As shown in FIG. 8, in step S20, the UE 100 determines whether start conditions for starting a quality measurement of neighboring cells adjacent to a current serving cell are satisfied. When the determination result is YES, the UE 100 performs a process of step S21. When the determination result is NO, the UE 100 ends a series of processes.

As described above, the start conditions are as follows.

(A1) A frequency having priority higher than that of the frequency of the current serving cell The UE 100 always measures quality of a frequency having high priority.

A2) A frequency having priority equal to or lower than that of the frequency of the current serving cell When the quality of the current serving cell falls below a predetermined threshold value, the UE 100 measures quality of a frequency having equal priority or lower priority.

As described above, in step S20, a priority (cellReselectionPriority) of a frequency may be corrected based on values (for example, UE-ID, random number, AC) having randomness.

In step S21, the UE 100 measures the quality of the neighboring cells adjacent to the current serving cell.

As described above, in step S21, qualities (for example, Squal, Srxlev, $Q_{meas, S}$, $Q_{meas, n}$) may be corrected based on the values (for example, UE-ID, random number, and AC) having randomness.

In step S22, the UE 100 selects, from cells (selection candidate cells) having the quality satisfying the predetermined quality criteria (S-criteria or R-criteria), the target cell used as the serving cell.

As described above, in step S22, the ranking of the selection candidate cells may be corrected based on the values (for example, UE-ID, random number, and AC) having randomness.

In the explanation according to FIG. 8, only a part of Modified Example 1 is illustrated, but it is to be noted that the UE 100 may select the target cell based on the values having randomness as described above.

The UE 100 (controller) according to Modified Example 1 selects the target cell based on the values having randomness. That is, even if the UEs 100 are located at a geographically close position, a variation occurs in the cell selected as the target cell. Therefore, it is possible to appropriately perform the load distribution to each cell. In other words, the UE 100 in the RRC idle state can be appropriately distributed to each cell.

Modified Example 2

Modified Example 2 of the embodiment will be described. Differences from the embodiment will be mainly described.

Specifically, according to the embodiment, even when a quality of a current serving cell satisfies the predetermined quality criteria, a UE 100 measures a quality of neighboring cells adjacent to a current serving cell at a predetermined timing. On the other hand, in Modified Example 2, as shown in B1 to B3 described in the embodiment, the UE 100 (controller) selects, from cells having quality satisfying predetermined quality criteria (S-criteria and R-criteria), a target cell used as a serving cell. The UE 100 (controller) selects a target cell based on different redistribution parameters for each group including at least one UE 100.

A group to which the UEs 100 belong is specified by a message (for example, RRC Connection Release) used in a transition procedure from a connected state to an idle state. A message (for example, RRC Connection Release) may also include group identification information identifying the group to which the UEs 100 belong.

Redistribution parameters include a priority (cellReselectionPriority) of frequency, predetermined period ($Treselection_{RAT}$), various offsets ($Q_{qualminoffset}$, $Q_{rxlevminoffset}$, $Qoffset_{temp}$, $Q_{Hyst}$ and Qoffset), and various threshold values ($Thresh_{X,HighQ}$, $Thresh_{X,highP}$, $Thresh_{Serving,LowQ}$, and $Thresh_{Serving,LowP}$).

In Modified Example 2, redistribution parameters are preferably included in system information (system information block (SIB)) broadcast from the current serving cell. That is, a cell that broadcasts the redistribution parameters may be different from a cell that transmits the message (for example, RRC Connection Release). The redistribution parameters may also be included in the message (for example, RRC Connection Release).

The UE 100 (controller) may maintain the group to which the UEs 100 belong until the RRC idle state is transitioned to the RRC connected state again. That is, the group to which the UEs 100 belong is canceled by the transition from the RRC idle state to the RRC connected state. The UE 100 (controller) may maintain the group to which the UEs 100 belong until the timer activated by the reception of the message (for example, RRC Connection Release) expires. That is, the group to which the UEs 100 belong may also be canceled when the timer activated by the designation of the group expires.

The group including one or more UEs 100 may be formed based on a category (throughput magnitude) of the UE 100, capability of the UE 100 (the number of streams of MIMO, or the like), statistics (S1 Initial UE Context Setup) on traffic of the UE 100, statistics (S1 Initial UE Context Setup) on mobility of the UE 100 and positional information (including a measurement report) of the UE 100.

The group including one or more UE 100 may be formed by an access class (AC) related to an access restriction of the UE 100. That is, the redistribution parameters differ for each access class related to the access restriction of the UE 100.

(Mobile Communication Method)

Figure 9:
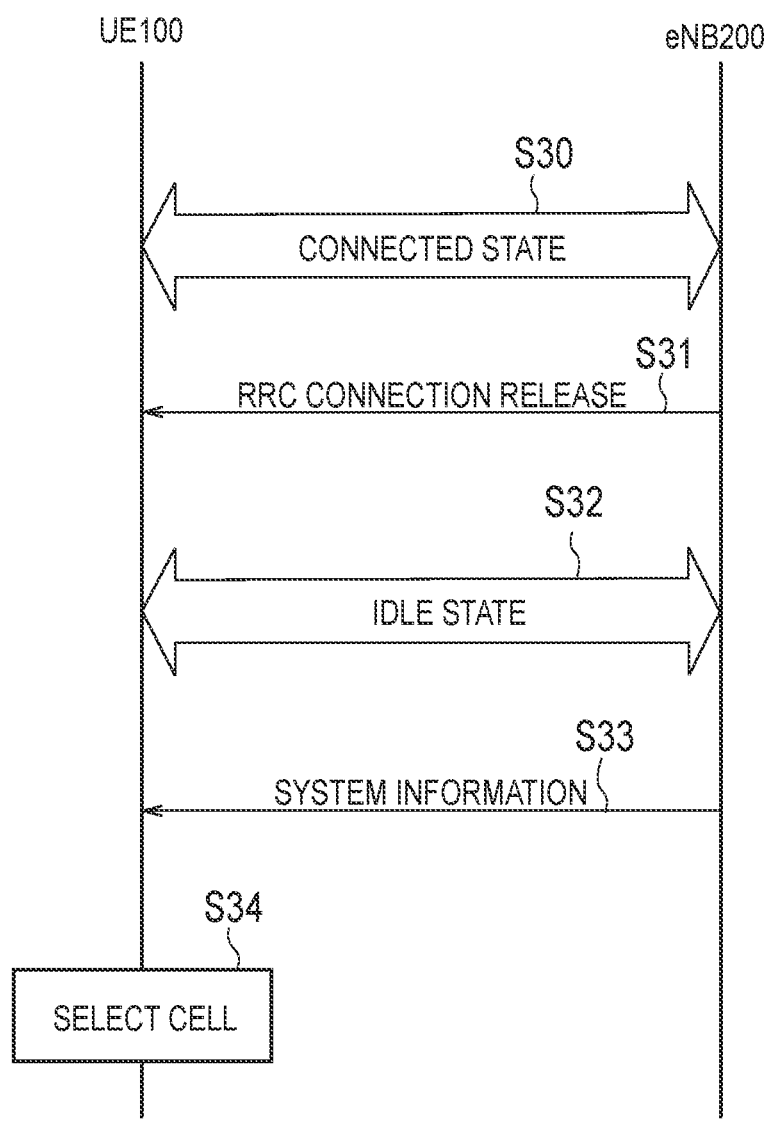
FIG. 9 is a sequence diagram showing a mobile communication method according to Modified Example 2.

A mobile communication method according to Modified Example 2 will be described. FIG. 9 is a sequence diagram showing a mobile communication method according to Modified Example 2.

As shown in FIG. 9, in step S30, the UE 100 is in an RRC connected state.

In step S31, the UE 100 receives a message (for example, RRC Connection Release) used in a transition procedure from a connected state to an idle state. The message (RRC Connection Release) may specify a group to which the UEs 100 belong.

In step S32, the UE 100 is in an RRC idle state.

In step S33, the UE 100 receives system information (system information block (SIB)) broadcast from an eNB 200 (current serving cell). The system information includes different redistribution parameters for each group to which one or more UE 100 belongs.

A cell that broadcasts redistribution parameters may be different from a cell that transmits the message (for example, RRC Connection Release).

In step S34, the UE 100 selects a target cell based on the redistribution parameters allocated to the group to which the UEs 100 belongs.

The UE 100 (controller) according to Modified Example 2 selects a target cell based on different redistribution parameters for each group including at least one UE 100. That is, even if the UEs 100 are located at a geographically close position, a variation occurs in the cell selected as the target cell for each group. Therefore, it is possible to appropriately perform the load distribution to each cell. In other words, the UE 100 in the RRC idle state can be appropriately distributed to each cell.

Modified Example 3

Modified Example 3 of the embodiment will be described. Differences from Modified Example 1 will be mainly described.

Modified Example 1 illustrates a sequence in which the UE 100 (controller) corrects a ranking of selection candidate cells based on values having randomness. On the other hand, in Modified Example 3, another method of selecting a target cell based on values having randomness will be described.

Specifically, the UE 100 (receiver) receives system information including a threshold value to be compared with a random number generated by the controller. The UE 100 (controller) selects the target cell based on a comparison result between the random number and a threshold value.

More specifically, as described above, the UE 100 (controller) calculates the ranking of each of the plurality of cells based on measurement results of the quality of each of the plurality of cells. As described above, the ranking is a ranking $R_s$ of a current serving cell and a ranking $R_n$ of neighboring cells. The UE 100 (controller) selects the target cell based on a comparison result between the random number and a threshold value.

In such a case, system information includes different threshold values for each ranking. The UE 100 (controller) generates a random number for each ranking, and selects a target cell based on comparison results between a random number and the threshold value for each ranking. The UE 100 (controller) compares the random number with the threshold value in descending order of the ranking. Then, the UE 100 may select, as a target cell, a cell in which comparison result between of the random number and the threshold value satisfies selection conditions.

For example, the system information includes information (Ranking_No, Probability) that associates the ranking with the threshold value. Such information (Ranking_No, Probability) is information such as {Rank 1, 0.6}, {Rank 2, 0.8}, {Rank 3, 1.0}. The {Rank 1, 0.6} means that a threshold value associated with Rank 1 is 0.6. The {Rank 2, 0.8} means that a threshold value associated with Rank 2 is 0.8. The {Rank 3, 1.0} means that a threshold value associated with Rank 3 is 1.0. A range in which the random number generated by the UE 100 (controller) is obtained is 0 to 1. The selection conditions in which the comparison result between the random number and the threshold value is to be satisfied are, for example, conditions in which the random number is equal to or smaller than the threshold value.

First, the UE 100 (controller) determines whether to select a cell of ranking 1 as a target cell. That is, the UE 100 (controller) generates a random number for the cell of the ranking 1 and determines whether the comparison result of the random number and 0.6 satisfies the selection conditions. For example, when the random number is 0.8, the UE 100 (controller) determines that the selection conditions are not satisfied. Therefore, the UE 100 (controller) continues to select the target cell.

Second, the UE 100 (controller) determines whether to select a cell of ranking 2 as a target cell. That is, the UE 100 (controller) generates a random number for the cell of the ranking 2 and determines whether the comparison result of the random number and 0.8 satisfies the selection conditions. For example, when the random number is 0.7, the UE 100 (controller) determines that the selection conditions are not satisfied. Therefore, the UE 100 (controller) selects the cell of the ranking 2 as the target cell and ends the selection of the target cell.

According to the method of selecting a target cell described above, the probability that the cell of the ranking 1 is selected as the target cell is 60%. The probability that the cell of ranking 2 is selected as the target cell is 32% ({1-0.6}×0.8). The probability that the cell of the ranking 3 is selected as the target cell is 8% (1-0. 6-0. 32). The threshold value included in the system information may be determined so that a cell having high ranking can be easily selected as a target cell. Modified Example 3 is not limited thereto, but the threshold value included in the system information may be determined based on the load or capability of the cell.

Modified Example 3 illustrates a case in which the system information includes information (Ranking_No, Probability) that associates the ranking with the threshold value. However, Modified Example 3 is not limited thereto. For example, the system information includes information (Priority, Probability) that associates the priority with the threshold value.

In such a case, the UE 100 (controller) generates random numbers for each priority, and selects a target cell based on a comparison result between random numbers for each priority and a threshold value. The UE 100 (controller) may compare the random number with the threshold in descending order of priority, and select, as the target cell, the cell in which the comparison result between the random number and the threshold value satisfies the selection condition.

The priority may be the priority of the frequency at which the cell is operated or may be the priority unique to the cell.

Modified Example 4

Modified Example 4 of the embodiment will be described. Differences from the embodiment and Modified Example 3 will be mainly described.

In Modified Example 4, the UE 100 (controller) triggers (or executes or starts, the same hereinafter) an operation (or procedure, the same hereinafter) of selecting (or reselecting, the same hereinafter) a target cell depending on a reference trigger notification that is any one of a plurality of trigger notifications broadcast from the current serving cell. The reference trigger notification is preferably any one of a plurality of trigger notifications. The reference trigger notification may be some of the plurality of trigger notifications, and may be two or more trigger notifications.

The trigger notification is a notification for directly or indirectly triggering the operation of selecting, by the UE 100, the target cell at the initiative of a network (here, the current serving cell). The trigger notification may be a notification broadcast plural times within a certain period of time. In other words, the trigger notification may be a notification instructing the UE 100 to perform the operation of selecting a target cell For example, the trigger notification may be the system information (system information block (SIB)) described in the embodiment. The system information described in the embodiment includes information for specifying a predetermined timing at which the UE 100 starts quality measurement of neighboring cells. It is to be noted that the system information described in the embodiment directly triggers the operation of the UE 100 to select the target cell.

The trigger notification may be the system information (system information block (SIB)) described in Modified Example 3. As described above, the system information described in Modified Example 3 includes a threshold value to be compared with a random number. The system information described in Modified Example 3 may include information (Ranking_No, Probability) that associates the ranking with the threshold value. The system information described in Modified Example 3 may include information (Priority, Probability) that associates the priority with the threshold value. The UE 100 (controller) selects, as the target cell, the cell in which the comparison result between the random number and the threshold value satisfies the selection conditions, in response to the reception of the system information described in Modified Example 3. It is to be noted that the system information described in Modified Example 3 indirectly triggers the operation of the UE 100 to select the target cell.

In such a case, each of the plurality of trigger notifications includes a counter value. The UE 100 (controller) stores, in the counter, the counter value included in the reference trigger notification depending on the trigger (or execution, the same hereinafter) of the operation of selecting the target cell. For example, the UE 100 maintains the counter in a memory 150. Each time the UE 100 triggers the operation of selecting the target cell depending on the reference trigger notification, the UE 100 may accumulate the counter value in the counter. When the counter value included in the trigger notification broadcast from the current serving cell matches the counter value stored in the counter, the UE 100 (controller) does not trigger (or does not execute) the operation of selecting the target cell depending on the trigger notification. When the counter value included in the trigger notification broadcast from the current serving cell does not match the counter value stored in the counter, the UE 100 (controller) triggers the operation of selecting the target cell. As a result, the operation of selecting the target cell by the UE 100 is triggered only once depending on any one (that is, the reference trigger notification) of the trigger notifications broadcast plural times within a certain period of time. In other words, depending on each of the plurality of trigger notifications within a certain period of time, a situation in which the operation of selecting the target cell is triggered plural times is suppressed. In other words, the UE 100 triggers the operation of selecting a target cell at most once depending on one kind of trigger notification. The counter value may be a predetermined numerical value (0 to 9, or the like).

The counter value included in each of the plurality of trigger notifications is updated by the current serving cell at the timing at which the UE 100 triggers the operation of selecting the target cell. That is, the current serving cell broadcasts the trigger notification including the updated counter value plural times within a certain period of time at a timing at which the UE 100 in the RRC idle state is redistributed to each cell.

When the UE 100 triggers the operation of selecting a target cell plural times depending on each of the plurality of trigger notifications, most UEs 100 located in the current serving cell select the target cell. In other words, most UEs 100 select similar cells as the serving cell, and as a result, the UE 100 in the RRC idle state cannot be appropriately distributed to each cell.

In Modified Example 4, the UE 100 (controller) triggers an operation of selecting a target cell depending on the reference trigger notification that is any one of the plurality of trigger notifications broadcast from the current serving cell. In other words, the UE 100 in the RRC idle state can be appropriately distributed to each cell.

Modified Example 5

Modified Example 5 of the embodiment will be described. Differences from Modified Example 4 will be mainly described.

In Modified Example 4, a trigger notification may be system information (system information block (SIB)) described in the embodiment or Modified Example 3. On the other hand, in Modified Example 5, the trigger notification is a reselection request signal that requests reselection of the target cell.

In Modified Example 5, a UE 100 (receiver) receives, from a current serving cell, a reselection request signal requesting a reselection of the target cell. The UE 100 (controller) performs the reselection of the target cell in response to the reception of the reselection request signal. It is to be noted that the UE 100 (controller) starts a quality measurement of neighboring cells depending on the reselection of the target cell even if start conditions shown in A1 and A2 describe above are not satisfied.

The current serving cell broadcasts the reselection request signal when the load of the current serving cell is equal to or greater than the predetermined load. It is preferable that the current serving cell repeatedly broadcasts the reselection request signal in a period during which the load of the current serving cell is equal to or greater than the predetermined load. In other words, the UE 100 (receiver) receives the reselection request signal from the current serving cell when the load of the current serving cell is equal to or greater than the predetermined load. It is preferable that the UE 100 (receiver) repeatedly receives the reselection request signal in a period during which the load of the current serving cell is equal to or greater than the predetermined load.

In Modified Example 5, the reselection request signal includes redistribution parameters to make it difficult to select the current serving cell as the target cell. The UE 100 (controller) selects the target cell based on the redistribution parameters. In detail, the redistribution parameters may be parameters that are specified to change a priority (cellReselectionPriority) of a frequency of the current serving cell to a lowest priority (lowestpriority). The redistribution parameter may be an offset indicating the number of steps of decreasing the priority (cellReselectionPriority) of the frequency of the current serving cell. The redistribution parameters may be various offsets ($Q_{qualminoffset}$, $Q_{rxlevminoffset}$, $Qoffset_{temp}$, $Q_{Hyst}$, and $Qoffset$) and various thresholds ($Thresh_{X,HighQ}$, $Thresh_{X,HighP}$, $Thresh_{Serving,LowQ}$, and $Thresh_{Serving,LowP}$).

In Modified Example 5, the redistribution parameters applied in response to the reception of the reselection request signal is not included in the reselection request signal, but may be included in the system information (system information block (SIB)) separately broadcast from the reselection request signal from the current serving cell. The redistribution parameters applied in response to the reception of the reselection request signal may be preset. In such a case, the UE 100 (controller) performs the reselection of the target cell based on the redistribution parameters or the preset redistribution parameters, which are broadcast from the current serving cell, in response to the reception of the reselection request signal.

In Modified Example 5, even when the UE 100 (controller) receives the reselection request signal, if the predetermined conditions are satisfied, the UE 100 (controller) may maintain a location of the current serving cell without performing the reselection of the target cell. The predetermined conditions are conditions regarding at least one of a class of the UE 100 (UE class), a priority of a frequency of the current serving cell, power consumption setting of the UE 100, a time elapsed after receiving the previous reselection request signal and values having randomness.

For example, when the class (UE class) of the UE 100 is a machine type communication (MTC) or a dedicated data terminal, the communication data amount is small. In this case, the UE 100 (controller) preferably maintains the location of the current serving cell without performing the reselection of the target cell.

If the priority of the frequency of the current serving cell is the highest priority, it is highly likely to receive MBMS data or provide a D2D proximity service (D2D ProSe). In this case, the UE 100 (controller) preferably maintains the location of the current serving cell without performing the reselection of the target cell.

When the power consumption setting of the UE 100 is the low power consumption setting, in order to suppress the power consumption, the UE 100 (controller) maintains the location of the current serving cell without performing the reselection of the target cell.

If the time that has elapsed after the reception of the previous reselection request signal has not passed a predetermined time, to suppress the ping-pong effect, the UE 100 (controller) preferably maintains the location of the current serving cell without performing the reselection of the target cell. For example, it is preferable that the UE 100 (controller) activates the timer at the timing of receiving the previous reselection request signal and does not perform the reselection of the target cell until the timer expires.

To suppress the situation in which the plurality of UEs 100 reselect the target cell all at once and also allocate the UE 100 to each cell in a random manner, if the values having randomness are values other than a predetermined value, it is preferable that the UE 100 (controller) maintains the location of the current serving cell without performing the reselection of the target cell. The values having randomness may not be values common to all the UEs 100 located in the current serving cell. For example, the value having randomness may be a subframe number (SFN) in which the UE 100 receives the reselection request signal. The value having randomness may be an identifier (UE-ID) of the UE 100 that receives the reselection request signal. The value having randomness may be a random number generated by the UE 100. For example, the UE 100 (controller) performs the reselection of the target cell when SFNmodUE-ID (÷n)=0 is satisfied. The UE 100 (controller) does not perform the reselection of the target cell when SFNmodUE-ID (÷n)=0 is not satisfied. n is a predetermined value or a value broadcast from the serving cell.

Modified Example 6

Modified Example 6 of the embodiment will be described. Differences from the embodiment and any one of Modified Example 1 to Modified Example 5 will mainly be described.

Specifically, in the embodiment and Modified Example 1 to Modified Example 5, signals such as system information (system information block (SIB)) are broadcast from a current serving cell to a UE 100.

On the other hand, in Modified Example 6, signals such as the system information broadcast from the current serving cell are broadcast to the UE 100 and are notified even to neighboring cells (eNB 200) adjacent to the current serving cell (eNB 200). Alternatively, a load state of the current serving cell (eNB 200) is notified even to the neighboring cells (eNB 200) adjacent to the current serving cell (eNB 200). The signal or the load state such as system information are exchanged between cells through an X2 interface connecting between two or more eNBs 200. A coordination control of the plurality of cells can be made since the signal (parameters that prompt the reselection of the target cell) such as the system information broadcast in each cell or the load state of each cell are shared.

For example, in a case where all the loads of the plurality of cells adjacent to each other are high, it is possible to suppress a phenomenon (ping-pong phenomenon) in which the reselection of the target cell frequently occurs among a plurality of cells. Specifically, in a case in which the signals (parameters that prompt the reselection of the target cell) such as the system information are broadcast in neighboring cells or a case in which the load of the neighboring cells is higher than the threshold value, the current serving cell is pending the notification of the signals (parameters that prompt the reselection of the target cell) such as the system information for the UE 100.

As described in the embodiment, the signals such as the system information may include parameters that specify the timing (specific timing) at which the quality measurement of the neighboring cells is started. As described in Modified Example 1, the signals such as the system information may include a predetermined range that is referenced by selecting a target cell based on values having randomness. As described in Modified Example 2, the signals such as the system information may include different redistribution parameters for each group including one or more UE 100. As described in Modified Example 3, the signals such as the system information may include a threshold value to be compared with a random number generated by the controller. As described in Modified Example 4, the signals such as the system information may include a trigger notification that prompts the reselection of the target cell. As described in Modified Example 5, the signals such as the system information may include the reselection request signal that prompts the reselection of the target cell, and may include the redistribution parameters applied in response to the reception of the reselection request signal.

Modified Example 7

Modified Example 7 of the embodiment will be described. Differences from Modified Example 5 will be mainly described.

Although not specifically mentioned in Modified Example 5, in Modified Example 7, a reselection request signal is included in a paging signal broadcast from an eNB 200 (serving cell).

Specifically, a transmitter of the eNB 200 (serving cell) broadcasts the paging signal with different paging opportunities. The eNB 200 (serving cell) broadcasts the paging signal including a reselection request signal the requests a reselection of a target cell.

The paging opportunity is a subframe including the paging signal. One or more paging opportunity is included in a radio frame (paging frame). A paging frame (PF) is calculated by PF=SFNmodT=(TdivN)×(UE_IDmodN). T represents a DRX cycle of a UE 100, and N is represented by min (T, nB). nB is a value selected from 4T, 2T, T, T/2, T/4, T/8, T/16 and T/32. The paging opportunity is defined by a relationship of Ns and i_s. i_s is represented by i_s=floor (UE_ID/N) modNs. Ns is represented by max (1, nB/T).

In Modified Example 7, the eNB 200 (serving cell) broadcasts a first paging signal as the paging signal including the reselection request signal at a first paging opportunity. The eNB 200 (serving cell) broadcasts a second paging signal as the paging signal not including the reselection request signal at a second paging occasion different from the first paging opportunity. In other words, the eNB 200 (serving cell) determines whether the reselection request signal is included or not in the paging signal at every paging cycle. Then, the eNB 200 (serving cell) broadcasts the paging signal including the reselection request signal or the paging signal not including the reselection request signal at every paging cycle.

The UE 100 (receiver) receives the paging signal broadcasted from the current serving cell. It is to be noted that the UE 100 receives the paging signal at the paging cycle allocated to a self terminal. The UE 100 (controller) performs the reselection of the target cell depending on the reselection request signal included in the paging signal. Similar to Modified Example 5, it is to be noted that the UE 100 (controller) starts the quality measurement of the neighboring cells depending on the reselection of the target cell even if the start conditions shown in A1 and A2 describe above are not satisfied.

In Modified Example 7, it is preferable that the UE 100 performs the reselection of the target cell depending on the reselection request signal included in the paging signal, even if the paging signal received at the paging cycle allocated to a self terminal is not a paging signal addressed to a self terminal.

In Modified Example 7, the UE 100 performs the reselection of the target cell in response to the reselection request signal included in the paging signal. That is, by the trigger on the network (current serving cell) side, the UE 100 in the RRC idle state is prompted to reselect the target cell. Therefore, it is possible to appropriately perform the load distribution to each cell. In other words, the UE 100 in the RRC idle state can be appropriately distributed to each cell.

Since the paging cycle differs for each UE 100, the randomness of the UE 100 that performs the reselection of the target cell in response to the reselection request signal included in the paging signal is secured, and the UE 100 in the RRC idle state can be appropriately allocated to each cell.

In Modified Example 7, the eNB 200 (serving cell) determines whether the reselection request signal is included or not in the paging signal at every paging cycle. Then, the eNB 200 (serving cell) broadcasts the paging signal including the reselection request signal or the paging signal not including the reselection request signal at every paging cycle. Therefore, the eNB 200 (serving cell) side can control the proportion of the UE 100, which reselects the target cell depending on the reselection request signal included in the paging signal, to some extent. For example, by determining the proportion of the UE 100 that performs the reselection of the target cell, the load dispersion of each cell can be appropriately performed depending on the load of the eNB 200 (serving cell).

Modified Example 8

Modified Example 8 of the embodiment will be described. Differences from Modified Example 1 will be mainly described.

In detail, in Modified Example 1, a case in which a UE 100 (controller) may also correct quality (for example, Squal, Srxlev, $Q_{meas,s}$, and $Q_{meas,n}$) based on values (for example, UE-ID, random number, AC) having randomness is illustrated. In such a case, various offsets ($Q_{qualminoffset}$, $Q_{rxlevminoffset}$, $Qoffset_{temp}$, $Q_{Hyst}$, and Qoffset) are calculated by, for example, offset=(default offset)×(UE-ID÷n).

On the other hand, in Modified Example 8, the UE 100 (controller) calculates various threshold values ($Thresh_{X,HighQ}$, $Thresh_{X,HighP}$, $Thresh_{Serving,LowQ}$, and $Thresh_{Serving,LowP}$) based on values having randomness (for example, UE-ID, random number, and AC). As described above, various threshold values are an example of various parameters used for selecting a target cell. Various threshold values are calculated, for example, by threshold=(default threshold)×(UE-ID÷n). n is a predetermined value or a value broadcast from the serving cell.

Modified Example 9

Modified Example 9 of the embodiment will be described. Differences from Modified Example 5 will be mainly described.

In Modified Example 5, a UE 100 (controller) performs a reselection of a target cell in response to a reception of a reselection request signal. The UE 100 (controller) selects the target cell based on redistribution parameters included in the reselection request signal. On the other hand, in Modified Example 9, the UE 100 (controller) performs the first reselection process depending on a trigger independent to the reselection request signal, and performs second reselection processing different from first reselection processing in response to reception of the reselection request signal.

When any one of the start conditions A1 to A2 described above is satisfied, the first reselection processing is processing of selecting the target cell in the case in which the quality of the neighboring cells adjacent to the current serving cell is measured and any one of the selection conditions B1 to B3 described above is satisfied. The second reselection processing is processing of applying a rule different from the first selection processing in the reselection of the target cell. A rule applied to the second reselection processing is as follows.

(Rule 1)

In Rule 1 applied to the second reselection processing, the UE 100 does not use a preset priority (cellReselectionPriority) of frequency.

For example, the UE 100 uses the same priority as the priority of each cell or frequency instead of the preset priority of frequency. In such a case, only the above A2 may be used as the start condition. Only the above B2 may be used as the selection condition.

The UE 100 may disregard the preset priority (cellReselectionPriority) of frequency. In such a case, only any one of the above A1 and A2 may be used as the start condition. Only any one of the above B1 to B3 may be used as the selection condition.

The above B2 is processing (ranking processing) of performing the reselection of the target cell based on the ranking $R_s$ of the current serving cell and the ranking $R_n$ of the neighboring cells. In other words, in the case where only B2 is used, it is to be noted that the ranking process is performed on all cells in response to the reception of the reselection request signal. Alternatively, it is to be noted that in response to the reception of the reselection request signal, the ranking processing is performed on cells having quality equal to or higher than certain quality.

(Rule 2)

In Rule 2 applied to the second reselection processing, the UE 100 starts to measure the quality of a measurement target frequency included in broadcast information broadcast from the current serving cell in response to the reception of the reselection request signal. The broadcast information may be, for example, SIB4 that specifies a measurement frequency of intra-frequency. The broadcast information may be, for example, SIB5 that specifies a measurement frequency of inter-frequency.

In the first selection processing, when a cell selection quality level (Squal or Srxlev) of the current serving cell is smaller than a threshold value ($S_{IntraSearchP}$ or $S_{IntraSearchQ}$), the UE 100 starts the measurement of the intra-frequency. Similarly, when the cell selection quality level (Squal or Srxlev) of the current serving cell is smaller than the threshold value ($S_{InterSearchP}$ or $S_{InterSearchQ}$), the UE 100 starts the measurement of the inter-frequency. Under such a premise, the UE 100 may ignore the setting of the threshold ($S_{IntraSearchP}$ or $S_{IntraSearchQ}$) and start the measurement of the intra-frequency in response to the reception of the reselection request signal. The UE 100 may ignore the threshold ($S_{InterSearchP}$ or $S_{InterSearchQ}$) and start the measurement of the inter-frequency in response to the reception of the reselection request signal. The UE 100 may treat the cell selection quality level (Squal or Srxlev) as a minimum value and start the measurement of the quality of the measurement target frequency in response to the reception of the reselection request signal.

(Rule 3)

Rule 3 applied to the second reselection processing is a rule for selecting a target cell in the ranking processing. In the rule applied to the first processing, a cell with the highest ranking or a cell with ranking higher than the current serving cell is selected as a target cell. On the other hand, in Rule 3 applied to the second reselection processing, the following processing is performed.

For example, the UE 100 (controller) selects a target cell based on values having randomness, in the selection of the target cell. For example, the UE 100 (controller) specifies cells having the quality satisfying the predetermined quality criteria (S-criteria or R-criteria) and selects, from the specified cells (selection candidate cells), a target cell based on the values having randomness. In such a case, the UE 100 corrects a ranking of selection candidate cells based on values having randomness. The values having randomness are, for example, UE-ID, random number, and AC.

The UE 100 may select the cell with the highest ranking as the target cell. The UE 100 may select, as the target cell, cells having a higher ranking than the current serving cell.

In the ranking processing, the UE 100 may determine the ranking of the current serving cells or neighboring cells based on quality (RSRQ, SINR or the like) other than RSRP. Such a rule may be regarded as an extension of the above-mentioned "R-criteria".

(Rule 4)

In Rule 4 applied to the second reselection processing, the UE 100 does not use a time threshold value for a reselection of a target cell. Specifically, the time threshold value is a predetermined period ($Treselection_{RAT}$) that is compared with the time when the cell selection quality level (Squal or Srxlev) of the neighboring cells continues to satisfy the predetermined conditions and a prohibition time threshold value (for example, 1 second) that is compared with the elapsed time after visiting the current serving cell. That is, in the second reselection processing, the UE 100 treats the predetermined period ($Treselection_{RAT}$) or the prohibition time threshold value (for example, 1 second) as zero. Alternatively, the UE 100 disregards the predetermined period ($Treselection_{RAT}$) or the prohibition time threshold value (for example, 1 second).

(Rule 5)

In Rule 5 applied to the second reselection processing, the period during which the second reselection processing is applied is continued for a certain period.

For example, the second reselection processing is applied until the first cell is selected as the target cell by the second reselection processing and then the second cell is selected as the target cell by the second reselection processing.

In the period during which the timer is activated, the second reselection processing is applied. The timer may be activated by receiving the reselection request signal. The timer may be activated by selecting the target cell in the second reselection processing. The activation time of the timer may be broadcast from the current serving cell or may be included in the reselection request signal.

The second reselection processing may be applied until a message (for example, Reselection Request Cancel) canceling the second reselection processing is received.

Modified Example 10

Modified Example 10 of the embodiment will be described. Differences from the embodiment will be mainly described.

In the embodiment, in the cell reselection processing, a frequency of a measurement target or a selection target (hereinafter, a frequency to be measured) is not specifically mentioned. The frequency to be measured is generally included in broadcast information broadcast from the current serving cell. The broadcast information may be, for example, SIB4 that specifies a measurement frequency of intra-frequency. The broadcast information may be, for example, SIB5 that specifies a measurement frequency of inter-frequency. On the other hand, in Modified Example 10, a method of narrowing down a frequency to be measured in processing (hereinafter, referred to as UE distribution processing) for appropriately allocating a UE 100 in an RRC idle state to each cell will be described. The method of narrowing down a frequency to be measured is, for example, as follows.

(First Method)

In a first method, the frequency to be measured is narrowed down to a frequency having the same priority as priority (cellReselectionPriority) of frequency of the current serving cell.

(Second Method)

In a second method, in addition to the existing priority (first priority), expansion priority (second priority) is introduced as the priority of frequency. The frequency to be measured has the same existing priority as the existing priority of the frequency of the current serving cell and is narrowed down to the frequency having the same expansion priority as the expansion priority of the frequency of the current serving cell.

(Third Method)

In a third method, similar to the second method, in addition to the existing priority (first priority), expansion priority (second priority) is introduced as the priority of frequency. The frequency to be measured is narrowed down to a frequency in which the expansion priority is set without depending on the existing priority.

(Fourth Method)

In a fourth method, similar to the second method, in addition to the existing priority (first priority), expansion priority (second priority) is introduced as the priority of frequency. The frequency to be measured is narrowed down to a frequency having the same expansion priority as the expansion priority of the frequency of the current serving cell regardless of the existing priority.

(Fifth Method)

In a fifth method, when a frequency having priority higher than that of the frequency narrowed down by the first to fourth methods is detected, processing (that is, the first reselection processing described in Modified Example 9) of selecting a target cell may be applied in the case in which any one of the selection conditions B1 to B3 described above is satisfied.

In Modified Example 10, a method of narrowing down a frequency to be measured in UE distribution processing is described. The UE distribution processing may be any one of the methods described in the embodiment to Modified Example 9. For example, the UE distribution processing may be the processing of selecting a target cell based on values having randomness as described in Modified Examples 1, 3, and 8. The UE distribution processing may be the processing of selecting the target cell using different redistribution parameters for each group as described in Modified Example 2. The UE distribution processing may be the processing of selecting the target cell depending on a trigger notification (for example, reselection request signal) as described in Modified Examples 4, 5, 7, and 9.

Modified Example 11

Modified Example 11 of the embodiment will be described. Differences from Modified Example 5 will be mainly described.

In Modified Example 5, a UE 100 (receiver) receives, from a current serving cell, a reselection request signal requesting a reselection of a target cell. The UE 100 (controller) performs the reselection of the target cell in response to the reception of the reselection request signal.

In contrast, in Modified Example 11, the UE 100 (controller) may receive the reselection request signal and perform the reselection of the target cell when the predetermined trigger condition is satisfied. That is, even when the UE 100 (controller) receives the reselection request signal, if the predetermined trigger condition is not satisfied, the UE 100 (controller) may not perform the reselection of the target cell.

In Modified Example 11, the predetermined trigger condition is the condition that the priority (cellReselectionPriority) of the frequency of the current serving cell is not high priority (High Priority).

For example, when the current serving cell is a closed subscriber group (CSG) cell, the priority of the frequency of the CSG cell is set to be high priority. In such a case, the predetermined trigger condition is that the current serving cell is not the CSG cell. Therefore, the UE 100 receives the reselection request signal and performs the reselection of the target cell when the current serving cell is not the CSG cell. On the other hand, even when the UE 100 receives the reselection request signal, the UE 100 does not perform the reselection of the target cell when the current serving cell is the CSG cell. However, when the CSG cell is included in the neighboring cells of the current serving cell, the UE 100 may perform the reselection of the target cell even if the current serving cell is the CSG cell.

When the D2D proximity service (D2D ProSe) is set at the frequency of the current serving cell, the priority of the current serving cell is set to be high priority. In such a case, the predetermined trigger condition is that the D2D proximity service is not set at the current serving cell frequency or that the D2D proximity service can be set even if the UE 100 is not located in the current serving cell. Therefore, the UE 100 performs the reselection of the target cell when receiving the reselection request signal, in the case in which the D2D proximity service is not set in the frequency of the current service cell or the case in which the D2D proximity service can be set even if it is not located in the current serving cell. On the other hand, even when the UE 100 receives the reselection request signal, the UE 100 does not perform the reselection of the target cell in the case in which the D2D proximity service is set at the frequency of the current serving cell and the D2D proximity service cannot be set if the UE 100 is not located in the current serving cell. Whether the D2D proximity service can be set is influenced not only by the setting of the network (eNB 200 or the like) but also by the capability of the UE 100.

When the UE 100 is interested in the MBMS service provided at the frequency of the current serving cell, the priority of the current serving cell is set to be high priority. In such a case, the predetermined trigger condition is that the UE 100 is not interested in the MBMS service provided at the frequency of the current serving cell, or the MBMS service in which the UE 100 is interested at the frequency of the neighboring cells of the current serving cell is provided. Therefore, the UE 100 performs the reselection of the target cell when receiving the reselection request signal, in the case where the UE 100 is not interested in the MBMS service provided at the frequency of the current serving cell or in the case in which the MBMS service in which the UE 100 is interested at the frequency of the neighboring cells of the current serving cell is provided. On the other hand, the UE 100 does not perform the reselection of the target cell even when receiving the reselection request signal, in the case where the UE 100 is interested in the MBMS service provided at the frequency of the current serving cell or in the case in which the MBMS service in which the UE 100 is interested at the frequency of the neighboring cells of the current serving cell is not provided.

Modified Example 12

Modified Example 12 of the embodiment will be described. Differences from Modified Example 5 will be mainly described.

In Modified Example 5, the redistribution parameters may be parameters that are specified to change the frequency (cellReselectionPriority) of frequency of the current serving cell to a lowest priority (lowestpriority). In contrast, in Modified Example 12, a definition of the lowest priority (lowest priority) is clarified.

Specifically, the lowest priority may be priority lower than the lowest priority among priorities that can be set on a network (eNB 200) side.

The lowest priority is included in broadcast information (SIB5 or the like) broadcast from the neighboring cells of the current serving cell, and may be priority lower than the lowest priority among the priorities (cellReselectionPriority) included in the broadcast information received by the UE 100. That is, the lowest priority may be priority lower than the lowest priority among the priorities of the neighboring cells.

As already described in Modified Example 5, the UE 100 may replace the priority (cellReselectionPriority) included in broadcast information (SIB3) broadcast from the current serving cell with the lowest priority.

When a range in which the priority (cellReselectionPriority) is acquired is a range of 0 to 7 and a large value represents high priority, the lowest priority may be a negative value.

The reselection request signal may include an identifier indicating whether to replace the priority (cellReselectionPriority) of the frequency of the current serving cell with the lowest priority. For example, when the current serving cell provides the MBMS service, the current serving cell transmits a reselection request signal including an identifier indicating that the priority of the frequency of the current serving cell is to be replaced with the lowest priority. When the current serving cell does not provide the MBMS service, the current serving cell transmits the reselection request signal including the identifier indicating that the priority of the frequency of the current serving cell is to be replaced with the lowest priority.

Modified Example 13

Modified Example 13 of the embodiment will be described. Differences from Modified Example 5 will be mainly described.

In Modified Example 5, a UE 100 (receiver) receives, from a current serving cell, a reselection request signal requesting a reselection of a target cell. The UE 100 (controller) performs the reselection of the target cell in response to the reception of the reselection request signal.

On the other hand, in Modified Example 13, the UE 100 (controller) further performs the reselection (hereinafter, referred to as post reselection) of the target cell after performing the reselection (referred to as one-shot reselection) of the target cell in response to the reception of the reselection request signal. As described in Modified Examples 5 and 12, the UE 100 replaces the priority of the current serving cell (or the frequency of the current serving cell) in the one-shot reselection with the lowest priority and then selects, as the target cell, the neighboring cells (or the neighboring cells of the frequency) having priority higher than the lower priority.

In one shot reselection, the case in which two or more neighboring cells (or the neighboring cells of the frequency) having priority higher than the lowest priority are found is assumed. In such a case, the UE 100 can reselect the optimum cell as the target cell by performing the post reselection following the one-shot reselection.

The UE 100 may perform the post reselection only if the priority of the neighboring cells (or the frequency of the neighboring cells) is the same as the priority of the current serving cell. That is, when there are neighboring cells (or neighboring cells of a frequency) having the same priority as the priority of the cell (or the frequency of the cell) selected as the target cell in the one-shot reselection, the UE 100 may perform the post reselection. In the one-shot reselection, the UE 100 may perform the post reselection when two or more neighboring cells having the same priority are found as a target cell. When there are no neighboring cells (or neighboring cells of a frequency) having the same priority as the priority of the cell (or the frequency of the cell) selected as the target cell in the one-shot reselection, the UE 100 may omit the post reselection. In the one-shot reselection, the UE 100 may perform the post reselection when two or more neighboring cells having the same priority are not found as a target cell. The post selection processing may be started by performing the measurement of neighboring cells (or frequencies of neighboring cells) having the same priority.

In other words, when the processing described in A2 of the embodiment, that is, when the quality (for example, Srxlev and Squal) of the current serving cell falls below a predetermined threshold value ($S_{nonIntraSearchP}$ and $S_{nonIntraSearchQ}$), the processing of starting the measurement of the frequency having priority equal to or lower than the priority of the frequency of the current serving cell is modified as follows. Specifically, when the quality (for example, Srxlev and Squal) of the current serving cell is below a predetermined threshold value ($S_{nonIntraSearchP}$ and $S_{nonIntraSearchQ}$) or the current serving cell is a cell selected by the one-shot reselection, the UE 100 starts the measurement of the frequency having priority equal to or lower than the priority of the frequency of the current serving cell.

When the quality (for example, Srxlev and Squal) of the current serving cell is above the predetermined threshold value ($S_{nonIntraSearchP}$ and $S_{nonIntraSearchQ}$) or the current serving cell is not a cell selected by the one-shot reselection, the UE 100 may not start the measurement of the frequency having priority equal to or lower than the priority of the frequency of the current serving cell. That is, in such a case, the post reselection processing may be omitted.

The priority of the cell (or the frequency of the cell) is included in the broadcast information (SIB3, SIB5 or the like) broadcast from each cell, and the UE 100 may understand the priority based on the broadcast information.

In Modified Example 13, the post reselection may be performed only once after the one-shot reselection. That is, the post reselection may not be performed twice or more after the one-shot reselection.

In Modified Example 13, the UE 100 has a timer activated in response to execution of the one-shot reselection, and may perform the post reselection until the timer value reaches the threshold value. The threshold value to be compared with the timer value may be included in broadcast information (SIB or paging signal) broadcast from the current serving cell. The threshold value to be compared with the timer value may be included in the reselection request signal described above. The post reselection may be executed only once until the timer value reaches the threshold value. That is, it is unnecessary to perform the post-reselection twice or more until the timer value reaches the threshold value. The UE 100 has a timer activated in response to the execution of the post reselection, and does not execute the next post reselection until the timer value reaches the threshold value and may execute the next post reselection when the timer value reaches the threshold value. The UE 100 may reset or reactivate the timer if the next post reselection is executed when the timer value reaches the threshold value. Even when the timer value reaches the threshold value, the UE 100 can execute the quality measurement (for example, A1 and A2) and the cell reselection processing (for example, B1 to B3) that are described in the embodiment described above). For example, the UE 100 may execute the quality measurement of the neighboring cells (or frequency of the neighboring cells) and the cell reselection processing when the quality (for example, Srxlev and Squal) of the current serving cell is below the predetermined threshold value ($S_{nonIntraSearchP}$ and $S_{nonIntraSearchQ}$) even until the timer value reaches the threshold value.

Similar to Modified Example 5 or Modified Example 12, in the one-shot reselection according to Modified Example 13, the priority (cellReselectionPriority) included in the broadcast information (SIB3) broadcast from the current serving cell may be replaced with the lowest priority. In such a case, the UE 100 may still treat, as the lowest priority, the priority (cellReselectionPriority) of the cell (or the frequency of the cell) that requests the one-shot reselection in the post reselection. In this way, even when a setting defect or the like of a network occurs, the ping-pong effect in which a cell prior to performing the one-shot reselection is selected as the target cell is suppressed.

Modified Example 14

Modified Example 14 of the embodiment will be described. Differences from Modified Example 5 will be mainly described.

In Modified Example 14, when an eNB 200 (cell) performs processing (hereinafter, referred to UE distribution processing) of urging a UE 100 to reselect a target cell by a transmission of a reselection request signal, the eNB 200 may notify, via an X2 interface, neighboring eNBs of a message including the fact that UE distribution processing is performed. The timing at which the message including the fact that the UE distribution processing is performed is notified may be before the UE distribution processing is performed, the middle of performing the UE distribution processing, and after the UE allocation processing is performed. The middle of performing the UE distribution processing is a period from the timing at which the first reselection request signal is transmitted to the timing at which the last reselection request signal is transmitted, in the case of repeatedly transmitting the reselection request signal. In such a case, the timing before the UE allocation processing is performed may be earlier than the timing at which the first reselection request signal is transmitted. The timing after the UE distribution processing is performed may be later than the timing at which the last reselection request signal is transmitted.

After notifying, via the X2 interface, the neighboring eNBs of the message including the fact that the UE distribution processing is performed, the eNB 200 may notify, via the X2 interface, the neighboring eNBs of the message including the fact that the UE distribution processing is ended when the UE distribution processing is ended.

First, the neighboring eNBs notified that UE distribution processing is performed perform processing (hereinafter, referred to as reselection restriction processing) of preventing the eNB 200 (cell) notifying that the UE distribution processing is performed from being selected as a target cell.

For example, the neighboring eNBs that are notified that UE distribution processing is performed may set the priority of the eNB 200 (cell) notifying that the UE distribution processing is performed to be lower than priority of a cell managed by a local station. The neighboring eNBs may notify priority of a newly set eNB 200 (cell).

The neighboring eNBs notified that UE distribution processing is performed may be added to a list that should not select, as a target cell, the eNB 200 (cell) notifying that the UE distribution processing is performed. The neighboring eNBs may also broadcast the black list to which the eNB 200 (cell) is added.

Second, the neighboring eNBs notified that UE distribution processing is performed perform processing (hereinafter, referred to as handover restriction processing) of restricting a handover to the eNB 200 (cell) notifying that the UE distribution processing is performed.

For example, the neighboring eNBs notified that the UE distribution processing is performed may exclude, from the measurement target (Measurement Configuration), the eNB 200 (cell) notifying that the UE distribution processing is performed.

The neighboring eNBs notified that UE distribution processing is performed may restrict the transmission of the handover request to the eNB 200 (cell) notifying that the UE distribution processing is performed. The neighboring eNBs notified that UE distribution processing is performed may restrict a transmission of an additional request of an SeNB in dual connectivity for the eNB 200 (cell) notifying that the UE distribution processing is performed. The neighboring eNBs notified that UE distribution processing is performed may transmit a message excluded from the SeNB in the dual connectivity for the eNB 200 (cell) notifying that the UE distribution processing is performed.

The neighboring eNBs may be activated in response to the start of the reselection restriction processing or the handover restriction processing, and may cancel the reselection limit processing or the handover restriction processing when the timer value reaches the threshold value. The threshold value to be compared with the timer value may be preset, included in the message indicating that UE distribution processing is performed, or notified from an operation, administration and management (OAM) server. The neighboring eNBs may cancel the reselection restriction processing or the handover restriction processing when being notified that the UE distribution processing is ended.

Modified Example 15

Modified Example 15 of the embodiment will be described. Differences from the embodiment will be mainly described.

In the embodiment, values having randomness include a random number generated by a UE 100 (controller). In contrast, in Modified Example 15, the values having randomness do not include the random number generated by a UE 100 (controller). Also, the UE 100 determines whether to perform the reselection of the target cell based on the values having randomness.

For example, the value having randomness is a value (UE-ID) unique to the UE 100. The value (UE-ID) unique to the UE 100 may be an identifier (radio network temporary identifier (RNTI)) that is allocated by the current serving cell, an identifier (international mobile subscriber identity (IMSI)) that is uniquely allocated in advance to the UE 100, or an identifier (SAE-temporary mobile subscriber identity (S-TMSI)) that is allocated depending on a location registration of the UE 100.

In Modified Example 15, the UE 100 determines whether to reselect the target cell based on a value unique to the UE 100 and a value received from the current serving cell. Specifically, the value received from the current serving cell includes a value Np defining a probability to perform the reselection of the target cell and a value Nr for ensuring fairness among the UEs 100. The Np and Nr may be included in broadcast information broadcast from the current serving cell. In order to ensure the fairness among the UEs 100, it is preferable that the Nr is changed at a predetermined cycle. The Np may be a preset value regardless of the broadcast information broadcast from the current serving cell. Similarly, the Nr may be a preset value regardless of the broadcast information broadcast from the current serving cell.

For example, the UE 100 may perform the reselection of the target cell when the condition of (UE-IDmodNp)=Nr is satisfied. In such a case, the UE 100 may not perform the reselection of the target cell when the condition of (UE-IDmodNp)=Nr is not satisfied. As described above, it is possible to use the RNTI, the IMSI and the S-TMSI as the UE-ID. Therefore, as described above, the UE-ID may be replaced with any one of the RNTI, the IMSI and the S-TMSI.

The timing of determining whether to perform the reselection of the target cell based on the values having randomness may be "predetermined timing" described in the embodiment. The predetermined timing is specified based on, for example, the system information (system information block (SIB)) received from the current serving cell. The predetermined timing means the timing at which the quality measurement of the neighboring cells is started as the target cell is selected.

As described in the embodiment, the system information may also mean that the quality measurement of the neighboring cells is immediately started. In such a case, the UE 100 specifies, as the predetermined timing, the timing at which the system information is received, and starts the quality measurement of the neighboring cells in response to the reception of the system information.

The system information may include a subframe number at which the quality measurement of the neighboring cells is to be started. The UE 100 (controller) specifies, as a predetermined timing, the subframe number included in the system information, and starts the quality measurement of the neighboring cells at the specified subframe number.

The system information may include information indicating a period of a predetermined timing. For example, the system information includes a timer value to be set in a timer which is activated at the timing at which the quality measurement of the neighboring cells and the reselection or redistribution processing of the target cell are ended. The UE 100 specifies, as the predetermined timing, the timing at which the timer in which the timer value is set expires, and starts the quality measurement of the neighboring cells at the specified timing. The redistribution processing is a one shot scheme (OSS), a continuous re-distribution scheme (CRS) or the like which are described below.

In Modified Example 15, a case in which the value Nr for ensuring the fairness among the UEs 100 is included in the broadcast information broadcast from the current serving cell is exemplified. However, Modified Example 15 is not limited thereto. For example, a frame number or a subframe number including the predetermined timing may be used as Nr. For example, if the system information indicates that the quality measurement of the neighboring cells is started immediately, the frame number or the subframe number for receiving the system information is used as Nr. When the system information includes the subframe number at which the quality measurement of the neighboring cells should be started, the frame number or the subframe number at which quality measurement of the adjacent cell should be started is used as Nr.

A value (systemInfoValueTag) incremented according to updating of the contents of the system information SIB may be used as the value Nr for ensuring the fairness among the UEs 100. The systemInfoValueTag is included in the broadcast information SIB1 broadcast from the current serving cell.

It is preferable that the value of the Nr is selected so that the relationship of Nr<Np is satisfied. The UE 100 may perform the reselection of the target cell when the condition of (UE-IDmodNp)=(NrmodNp) is satisfied. In such a case, the UE 100 may not perform the reselection of the target cell when the condition of (UE-IDmodNp)=(NrmodNp) is not satisfied.

The UE 100 may perform the reselection of the target cell when at least one condition selected from three types of conditions of (UE-IDmodNp)>(NrmodNp), (UE-IDmodNp)<(NrmodNp), and (UE-IDmodNp)=(NrmodNp) is satisfied. At least one condition selected from three types of conditions (that is, equality signs or inequalities in the above equations) may be included in the broadcast information broadcast from the current serving cell.

A plurality of Nrs (for example, Nr 1 and Nr 2) may be set as the value Nr for ensuring the fairness among the UEs 100. In such a case, the UE 100 may perform the reselection of the target cell when the condition of (UE-IDmodNp)=(Nr1modNp) or the condition of (UE-IDmodNp)=(Nr2modNp) is satisfied.

A plurality of Nps (for example, Np1 and Np2) may be set as the value (Np) defining the probability to perform the reselection of the target cell. In such a case, the UE 100 may perform the reselection of the target cell when the condition of (UE-IdmodNp1)=(NrmodNp1) or the condition of (UE-IdmodNp2)=(NrmodNp2) is satisfied.

Modified Example 16

Modified Example 16 of the embodiment will be described. Differences from the embodiment will be mainly described.

In Modified Example 16, a UE 100 (receiver) receives redistribution parameters when being broadcast redistribution parameters for distributing a target cell selected as a serving cell from a current serving cell.

The redistribution parameters include at least one parameter selected from priority (cellReselectionPriority) of a frequency, priority (cell specific priority (CSP)) of a cell, a predetermined period (Treselection$_{RAT}$), various offsets (Q$_{qualminoffset}$, Q$_{rxlevminoffset}$, Qoffset$_{temp}$, Q$_{Hyst}$ and Qoffset), and various threshold values (Thresh$_{X,HighQ}$, Thresh$_{X,HighP}$, Thresh$_{Serving,LowQ}$, and Thresh$_{Serving,LowP}$). The redistribution parameters are included, for example, in system information (system information block (SIB)) broadcast from the current serving cell.

Under such a premise, when receiving the redistribution parameters from the current serving cell, the UE 100 (controller) performs first redistribution processing using the redistribution parameters in response to the reception of the reselection request signal. When not receiving the redistribution parameters from the current serving cell, the UE 100 (controller) performs second redistribution processing not using the redistribution parameters in response to the reception of the reselection request signal. The reselection request signal may be included in a paging signal broadcast from an eNB 200 (serving cell) as in Modified Example 7.

Specifically, in the first redistribution processing, the UE 100 performs the same processing as Modified Example 5, that is, the reselection of the target cell performed in response to the reception of reselection request signal. However, as described above, the redistribution parameters are used in the first redistribution processing.

The UE 100 makes it difficult for the current serving cell to be selected as the target cell in the second redistribution processing. For example, as the second redistribution processing, the following processing can be considered.

First, the UE 100 may relatively decrease the priority (cellReselectionPriority) of the frequency of the current serving cell in the second redistribution processing. For example, the UE 100 changes the priority (cellReselectionPriority) of frequency of the current serving cell to a lowest priority (lowestpriority). The UE 100 may increase the priority of the frequency other than the current serving cell.

Second, the UE 100 may relatively decrease the priority (CSP) of the current serving cell in the second redistribution processing. For example, the UE 100 changes the priority (CSP) of the current serving cell to the lowest priority (lowestpriority). The UE 100 may increase the priority of the cell other than the current serving cell.

Third, in the second redistribution process, the UE 100 may relatively decrease the priority (CSP) of the current serving cell when the cell priority (CSP) of the cell is set for at least one cell having the same frequency as the frequency of the current serving cell. In the second redistribution processing, the UE 100 may relatively decrease the priority (cellReselectionPriority) of the frequency of the current serving cell when the priority (CSP) is not set for all cells having the same frequency as the frequency of the current serving cell.

Fourth, the reselection request signal may include a predetermined value that specifies the priority to be applied in the second reselection process. In such a case, when the predetermined value is a first value (for example, 0), the UE 100 may relatively decrease the priority (CSP) of the current serving cell in the second redistribution processing, and when the predetermined value is a second value (for example, 1), the UE 100 may relatively decrease the priority (CSP) of the current serving cell in the second redistribution processing.

Modified Example 17

Modified Example 17 of the embodiment will be described. Differences from the embodiment will be mainly described.

In Modified Example 17, a UE 100 (receiver) receives, from a current serving cell, an indicator (OSS applicable) indicating whether to apply redistribution processing (one shot scheme (OSS)) for reselecting a target cell in response to a reception of a reselection request signal. An indicator is included, for example, in system information (system information block (SIB)) broadcast from the current serving cell.

Under such a premise, when the UE 100 (controller) receives an indicator indicating the application of the redistribution processing (OSS) and does not receive redistribution parameters from the current serving cell, the UE 100 (controller) may perform second redistribution processing in response to the reception of the reselection request signal. Under such a premise, when the UE 100 (controller) receives an indicator indicating the application of the redistribution processing (OSS) and does not receive redistribution parameters from the current serving cell, the UE 100 (controller) may perform the second redistribution processing in response to the reception of the reselection request signal.

When the UE 100 receives an indicator indicating a non-application of the redistribution processing (OSS) and receives redistribution parameters from the current serving cell, the UE 100 performs the reselection of the target cell using the redistribution parameters (continuous re-distribution scheme (CRS)) in response to a trigger that does not depend on the reselection request signal. The trigger that is independent to the reselection request signal is, for example, a trigger such as an expiration of a timer. A value set in the timer is included, for example, in system information (system information block (SIB)) broadcast from the current serving cell.

Modified Example 18

Modified Example 18 of the embodiment will be described. Differences from the embodiment will be mainly described.

In Modified Example 18, a UE 100 (receiver) receives a broadcast existence indicator indicating whether to broadcast redistribution parameters. The redistribution parameters are included, for example, in system information (system information block (SIB)) broadcast from a current serving cell. It is preferable that the broadcast existence indicator is included in system information (for example, MIB or SIB1) to be acquired before receiving system information (for example, SIB3) including redistribution parameters. The broadcast existence indicator may be included in a paging signal including a reselection request signal.

The UE 100 (receiver) receives a reacquisition indicator indicating whether the redistribution parameters need to be reacquired or not. The UE 100 reacquires the redistribution parameters when a reacquisition indicator indicates that the redistribution parameters need to be reacquired. The reacquisition indicator may be included in the system information (system information block (SIB)) broadcast from the current serving cell or may be included in the paging signal including the reselection request signal.

In such a case, when the reacquisition indicator indicates that the redistribution parameters need to be reacquired, the UE 100 (controller) uses the redistribution parameters after the reacquisition to perform first redistribution processing. That is, even when receiving the reselection request signal, the UE 100 is pending the first redistribution processing until the redistribution parameters are reacquired and performs the first redistribution processing after the redistribution parameters are reacquired. When the reacquisition indicator indicates that the redistribution parameters need to be reacquired, the UE 100 (controller) uses the redistribution parameters before the reacquisition to perform the first redistribution processing. That is, when the UE 100 receives the reselection request signal, the UE 100 performs the first redistribution processing without waiting for the reacquisition of the redistribution parameters.

In Modified Example 18, the broadcast existence indicator may be information indicating whether the redistribution parameters are broadcast or not in the next system change period (SI Modification Period). The reacquisition indicator may be information indicating whether to change the redistribution parameters in the next system change period (SI Modification Period). With such a configuration, it is possible to notify only the specific UE 100 of the broadcast existence indicator and the reacquisition indicator.

In addition, in the case in which for one frequency, both the redistribution parameters related to the priority of the frequency and the redistribution parameters related to the priority of the cell are notified from the current serving cell, an application parameter indicator indicating which of the redistribution parameters should be applied may be broadcast from the current serving cell. For example, the application parameter indicator indicates whether to apply the redistribution parameters related to the priority of the frequency, the redistribution parameters related to the priority of the cell, or the redistribution parameters related to both the priority of the frequency and the priority of the cell. The application parameter indicator may be included in the system information (system information block (SIB)) broadcast from the current serving cell or may be included in the paging signal including the reselection request signal. The UE 100 receiving the application parameter indicator determines the redistribution parameters using the redistribution processing based on the application parameter indicator.

Modified Example 19

Modified Example 19 of the embodiment will be described. Differences from the embodiment will be mainly described.

Similar to Modified Example 15, in Modified Example 19, a UE 100 (controller) performs a reselection of a target cell based on a value unique to the UE 100. In detail, the UE 100 adds a value unique to the UE 100 and performs first redistribution processing or second redistribution processing using different values for each frequency or cell.

For example, the UE 100 performs the first redistribution processing or the second redistribution processing according to the following equations.

[Math. 1]

$$redistrRange[i] = redistrFactor[i] \Big/ \sum_{j=0}^{j=(maxCandidateFreq-1)} redistrFactor[j] \quad \text{Equation (1)}$$

$$\{(UE\_ID + offset) \bmod 100\} <= 100 \times redistrRange[0] \quad \text{Equation (2)}$$

$$100 \times \sum_{j=0}^{j=i-1} redistrRange[j] < \quad \text{Equation (3)}$$

$$\{(UE\_ID + offset) \bmod 100\} <= 100 \times \sum_{j=0}^{j=i} redistrRange[j]$$

redistrRange [i] is a value that defines the probability that a cell of an i-th candidate frequency is selected as a target cell, and is a value between 0 and 1. redistrRange [0] is a value that defines the probability that a cell of a frequency of a current serving cell is selected as a target cell, and is a value between 0 and 1. UE_ID is a value unique to the UE, and offset is different values for each frequency or cell, and is a value between 0 and 100.

In such a case, when the offset is not used, a specific UE 100 that satisfies "(UE_IDmod 100)≤100×redeitrRange [0]" always continues to be located in the serving cell without moving from the current serving cell to a cell of another frequency. That is, the specific UE 100 is fixed without moving from the current serving cell. If such a situation is permitted, unfairness arises between the specific UE 100 and another UE 100. On the other hand, in Modified Example 19, it is possible to cancel unfairness among UEs 100 by introducing the offset.

If the offset is not used, the effect of the redistribution of the UE 100 on each cell is influenced by an initial distribution of the specific UE 100 satisfying "(UE_IDmod 100) ≤100×redeitrRange [0]". On the other hand, in Modified Example 19, it is possible to intentionally guide the specific UE 100 satisfying "{(UE_ID+offset) mod 100}≤100×redeitrRange [0]" to a specific frequency by introducing the offset. Considering the randomness of the UE_ID of the UE 100 located in each cell, it is possible to more effectively redistribute the UE 100 to each cell than the case in which the effect of redistribution of the UE 100 to each cell is influenced by the initial distribution of the specific UE 100 satisfying "(UE_IDmod 100)≤100×redeitrRange [0]".

In Modified Example 19, the offset may be included, for example, in the system information (system information block (SIB)) broadcast from the current serving cell and may be included in the paging signal including the reselection request signal. The offset may be included in an RRC message separately transmitted to the UE 100.

In Modified Example 19, the offset may be calculated based on different values for each frequency or cell and other parameters. As another parameter, it is possible to use time information (SFN or UTC) including the timing at which the UE 100 receives the reselection request signal. The offset may be different values for each frequency or cell, or a value set by the OAM.

In Modified Example 19, the case in which the following Equation (2) is applied and then the following Equation (3) is applied is applied, and to select the UE 100 that moves to an i-th candidate frequency cell, an order in which {(UE_ID+offset) mod 100} is substituted into the following Equation (3) is arbitrary. However, Modified Example 19 is not limited thereto.

Specifically, in the case in which the frequencies allocated to redeitrRange [0] to redeitrRange [j] are fixed, the order in which {(UE_ID+offset) mod 100} is substituted into the following Equation (2) or (3) may be specified. Alternatively, in the case in which {(UE_ID+offset) mod 100} is substituted into the following Equation (2) or (3) in an order of 0 to j, the frequency allocated to redeitrRange [0] to redeitrRange [j] may be designated. It is possible to intentionally control the redistribution process by the order designation or the frequency designation so that the UE 100 uses the cell of the specific frequency as the serving cell. The information including the above-mentioned order designation or frequency designation may be included in the system information (system information block (SIB)) broadcast from the current serving cell or may be included in the paging signal including the reselection request signal. When the order designation or the frequency designation do not exist, the processing of substituting {(UE_ID+offset) mod 100} into the following Equation (2) or (3) of the redeitrRange corresponding to the order or frequency which does not exist may be omitted.

Modified Example 20

Modified Example 20 of the embodiment will be described. Differences from Modified Example 5 will be mainly described.

Figure 10:
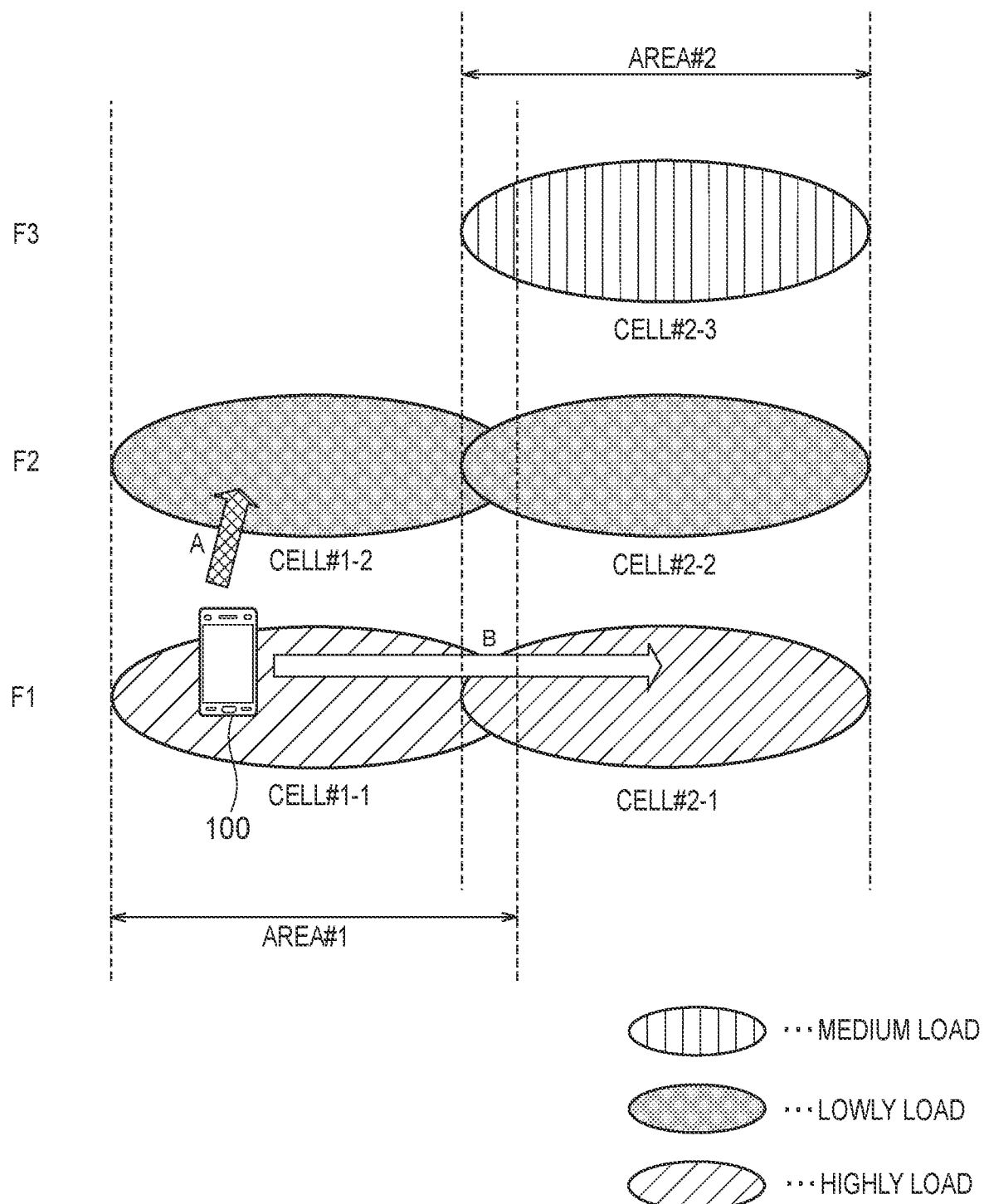
FIG. 10 is a diagram for explaining an application scene according to Modified Examples 20 to 22.

An application scene of Modified Example 20 is as shown in FIG. 10. As shown in FIG. 10, a mobile communication system has area #1 and area #2. In the area #1, cell #1-1 with frequency F1 and cell #1-2 with the frequency F1 are provided. In the area #2, cell #2-1 with the frequency F1, cell #2-2 with the frequency F1, and cell #2-3 with the frequency F1 are provided. The cells #1-1 and 2-1 with the frequency F1 are a highly load, and cells #1-2 and 2-2 with frequency F2 are a lowly load. Cell #2-3 with frequency F3 is a medium load, and has priority higher than that of the cells with the frequencies F1 and F2. For example, the cells with the frequencies F1 and F2 may be macro cells and the cells with frequency F3 may be CSG cells.

Similar to Modified Example 5, in Modified Example 20, the UE 100 (controller) activates a predetermined timer (T360) while performing the reselection of the target cell toward the cell in target frequency in response to the reception of the reselection request signal. The UE 100 (controller) uses the cell in target frequency as the target cell during the activation of the predetermined timer. For example, in the case shown in FIG. 10, upon receiving the reselection request signal from the cell #1-1 with the frequency F1 in the first area, the reselection of the target cell from the cell #1-1 with the frequency F1 to the cell #1-2 with the frequency F2 is performed (operation A shown in FIG. 10). It is assumed that the UE 100 moves from the area #1 to the area #2 after the operation A (operation B shown in FIG. 10).

In such a case, in Modified Example 20, the UE 100 (controller) changes the expiration time of the predetermined timer (T360) based on the moving speed of the UE 100. Specifically, the UE 100 (controller) sets a shorter expiration time as the expiration time of the predetermined timer as the moving speed of the UE 100 increases. For example, the UE 100 (controller) determines that the predetermined timer expires when the count time of the predetermined timer reaches a predetermined time threshold value (T-redistribution). Therefore, the predetermined time threshold value (T-redistribution) is a value defining the expiration time of the predetermined timer. The method of changing an expiration time of a predetermined timer is as follows, for example.

(1) The UE 100 (controller) may determine the expiration of the timer using a value obtained by multiplying a coefficient (ScalingFactor) based on the moving speed of the UE 100 to the predetermined time threshold value (T-redistribution) defining the expiration time of the predetermined timer. The coefficient is a value determined based on the moving speed, for example, a value between 0 and 1, for example. The faster the moving speed, the smaller the value of the coefficient.

For example, a case in which a moving speed slower than the predetermined moving speed is defined as a low-speed moving speed and a moving speed faster than the predetermined moving speed is defined as a high-speed moving speed is considered. When the coefficient corresponding to the low-speed moving speed is 1, the coefficient corresponding to the high-speed moving speed is, for example, 0.25. Therefore, when the moving speed of the UE 100 is the low-speed moving speed, it is determined that the predetermined timer expires in the case in which the count time of the predetermined timer reaches the value obtained by multiplying the coefficient (1) to the predetermined time threshold value (T-redistribution). When the moving speed of the UE 100 is the high-speed moving speed, it is determined that the predetermined timer expires in the case in which the count time of the predetermined timer reaches the value obtained by multiplying the coefficient (0.25) to the predetermined time threshold value (T-redistribution).

The UE 100 may disregard the count time of the predetermined timer (T360) when the moving speed of the UE 100 exceeds the predetermined threshold value. The UE 100 may cause the predetermined timer to expire when the moving speed of the UE 100 exceeds a predetermined threshold. The UE 100 may set a time threshold value shorter than the predetermined time threshold value (T-redistribution) in the predetermined timer when the moving speed of the UE 100 exceeds the predetermined threshold value. In these cases, similar to Modified Example 23 to be described below, the UE 100 may perform the following processing after disregarding the predetermined timer or after the expiration of the predetermined timer. Specifically, the UE 100 may perform the reselection of the target cell toward the cell in target frequency based on the redistribution parameter. The UE 100 may perform the reselection of the target cell based on the absolute priority broadcasted by the system information when an information element indicating that the target cell is reselected only by the reselection request signal (see modification example 7) included in the paging signal is included in the system information.

(2) The UE 100 (receiver) receives a plurality of predetermined time threshold values defining the expiration time of the predetermined timer. The UE 100 (controller) determines the expiration of the timer using the predetermined time threshold value selected based on the moving speed of the UE 100 from the plurality of predetermined time thresholds. The faster the moving speed, the smaller the predetermined time threshold value.

For example, a case in which a moving speed slower than the predetermined moving speed is defined as a low moving speed and a moving speed faster than the predetermined moving speed is defined as a high moving speed is considered. The predetermined time threshold value (T-redistribution_2) corresponding to the high-speed moving speed is shorter than the predetermined time threshold (T-redistribution-1) corresponding to the low-speed moving speed. The plurality of predetermined time threshold value may be included in the system information (SIB) broadcast from an eNB 200 that has a cell #2-3 having priority higher than that of the cells #1-2 and 2-2 in target frequency F2.

(3) The UE 100 (controller) may determine the expiration of the timer based on the combination of (1) and (2). That is, the UE 100 (controller) may determine the expiration of the timer by using the value obtained by multiplying the coefficient to a predetermined time threshold value selected based on the moving speed of the UE 100.

In any one of the procedures (1) to (3) described above, the UE 100 (controller) may change the expiration time of the predetermined timer when the moving speed of the UE 100 changes after the activation of the predetermined timer. The UE 100 may change the expiration time of the predetermined timer based on the moving speed after the change.

In such a case, the UE 100 (controller) may change the expiration time of the predetermined timer when the moving speed of the UE 100 becomes faster than the moving speed of the UE 100 referenced when the predetermined timer is activated. The UE 100 (controller) may change the expiration time of the predetermined timer when the moving speed of the UE 100 is lower than the moving speed of the UE 100 referenced when the predetermined timer is activated.

The UE 100 (controller) may change the expiration time of the predetermined timer during the activation of the predetermined timer. The UE 100 (controller) may change the expiration time of the predetermined timer after the expiration of the predetermined timer.

According to Modified Example 20, when during the activation of the predetermined timer, the UE 100 is highly likely to move from the area #1 in which the UE 100 was located when the UE 100 receives the reselection request signal to the area #2 in which the cell #2-3 having priority higher than that of the cells #1-2 and #2-2 in target frequency F2 is provided, the UE 100 can suppress the situation in which the cell with the high priority is not selected as the target cell until the predetermined timer expires. It is possible to suppress the ping-pong effect between the source frequency and the target frequency when the possibility that the UE 100 moves from the area #1 to the area #2 during the activation of the predetermined timer is low.

Modified Example 21

Modified Example 21 of the embodiment will be described. Differences from Modified Example 20 will be mainly described. The application scene of Modified Example 21 is the same as Modified Example 20.

In Modified Example 20, a UE 100 (controller) changes an expiration time of a predetermined timer (T360) based on a moving speed of the UE 100. In contrast, in Modified Example 21, the UE 100 (controller) stops the predetermined timer when receiving a stop request signal requesting the stop of the predetermined timer. The stop request signal may be broadcast from the eNB 200 having the cell #2-3 having priority higher than that of the cells #1-2 and 2-2 in target frequency F2. That is, the stop request signal may not be broadcast from the eNB 200 having the cell provided in the area #1. The stop request signal may be included in the system information (SIB) broadcast from the eNB 200 having the cell provided in the area #2.

The UE 100 (controller) may stop the predetermined timer when the moving speed of the UE 100 is faster than the predetermined speed and the stop request signal is received. That is, even when the UE 100 receives the stop request signal, the UE 100 may not stop the predetermined timer when the moving speed of the UE 100 is lower than the predetermined speed. When receiving the stop request signal regardless of the moving speed of the UE 100, the UE 100 (controller) may stop the predetermined timer.

According to Modified Example 21, similarly to Modified Example 20, in the case where there is a high possibility that the UE 100 moves from the area #1 to the area #2 during the activation of the predetermined timer, it is possible to suppress the situation in which the high priority cell is not selected as the target cell until the predetermined timer expires. It is possible to suppress the ping-pong effect between the source frequency and the target frequency when the possibility that the UE 100 moves from the area #1 to the area #2 during the activation of the predetermined timer is low.

Modified Example 22

Modified Example 22 of the embodiment will be described. Differences from Modified Example 20 will be mainly described. The application scene of Modified Example 22 is the same as Modified Example 20.

In Modified Example 20, a UE 100 (controller) changes an expiration time of a predetermined timer (T360) based on a moving speed of the UE 100. In contrast, in Modified Example 22, the UE 100 (controller) performs a reselection of a target cell to an inter-frequency cell in response to a reception of an inter-frequency reselection request signal during an activation of a predetermined timer. The inter-frequency reselection request signal may be broadcast from an eNB 200 having the cell #2-3 having priority higher than that of the cells #1-2 and #2-2 in target frequency F2. That is, the inter-frequency reselection request signal may not be broadcast from the eNB 200 having the cell provided in the area #1. The inter-frequency reselection request signal may be included in the system information (SIB) broadcast from the eNB 200 having the cell provided in the area #2.

In Modified Example 22, even when the reselection of the target cell to the inter-frequency cell is performed in response to reception of the inter-frequency reselection request signal, the predetermined timer may not be stopped.

The UE 100 (controller) may perform the reselection of the target cell to the inter-frequency cell based on the parameter broadcast from the cell (cell #2-2) in target frequency F2, not the parameter broadcast from the cell of a source frequency F1 (cell #1-1). Various parameters broadcast from the cell (cell #2-2) in target frequency (F2) include, for example, priority (cellReselectionPriority) of frequency, predetermined period (Treselection$_{RAT}$), various offsets ($Q_{qualminoffset}$, $Q_{rxlevminoffset}$, Qoffset$_{temp}$, $Q_{Hyst}$, and Qoffset), and various threshold values (Thresh$_{X,HighQ}$, Thresh$_{X,HighP}$, Thresh$_{Serving,LowQ}$, and Thresh$_{Serving,LowP}$).

According to Modified Example 22, similarly to Modified Example 20, in the case where there is a high possibility that the UE 100 moves from the area #1 to the area #2 during the activation of the predetermined timer, it is possible to suppress the situation in which the high priority cell is not selected as the target cell until the predetermined timer expires. It is possible to suppress the ping-pong effect between the source frequency and the target frequency when the possibility that the UE 100 moves from the area #1 to the area #2 during the activation of the predetermined timer is low.

Modified Example 23

Modified Example 23 of the embodiment will be described.

A user terminal according to Modified Example 23 includes: a controller that selects, from a plurality of cells operated at different frequencies, a target cell to be used as a serving cell; and a receiver that receives, from a current service cell, a reselection request signal for requesting a reselection of the target cell. The controller performs the reselection of the target cell toward the cell in target frequency and activates the predetermined timer, in response to the reception of the reselection request signal. The controller uses the cell in target frequency as the target cell during the activation of the predetermined timer. The controller changes the expiration time of the predetermined timer based on the moving speed of the user terminal.

Under the premise that the priority of the frequency or the cell (hereinafter, referred to as absolute priority (Absolute Priority (=cellReselectionPriority)) is broadcasted from the current serving cell by the system information (SIB), the case in which the UE 100 (receiver) receives the redistribution parameters is considered. The redistribution parameters may be, for example, at least one of a value (redistributionServingInfo) defining the probability that the serving cell or the cell with the same frequency as the serving cell is selected as the target cell and a value (redistributionInterFreqInfo) defining the probability that a cell with the same frequency as an i-th candidate frequency or an i-th candidate cell is selected as the target cell.

"RedistributionServingInfo" includes, for example, "redistributionFactorServing", "redistributionFactorCell", "t360" and "redistrOnPagingOnly". "RedistributionFactorServing" is an information element indicating the probability that the serving cell or the cell having the same frequency as the serving cell is selected as the target cell. "RedistributionFactorCell" is an information element indicating whether the above-mentioned probability ("redistributionFactorServing") is applied on a cell basis or on a frequency basis. "t360" is a value set in the above-mentioned predetermined timer (T360). "RedistrOnPagingOnly" is an information element indicating to reselect the target cell only by the reselection request signal (see Modified Example 7) included in the paging signal.

"RedistributionInterFreqInfo" includes, for example, "redistributionFactorFreq" and "redistributionFactorCell". "RedistributionFactorFreq" is an information element indicating the probability that the cell with the same frequency as the i-th candidate frequency is selected as the target cell. "RedistributionFactorCell" is an information element indicating the probability that the i-th candidate frequency is selected as the target cell. "redistributionInterFreqInfo" may include setting of frequency units ("redistributionFactorFreq" and "redistributionFactorCell") in a list form". "redistributionInterFreqInfo" may include setting of cell units ("redistributionFactorFreq" and "redistributionFactorCell") using one frequency in a list form".

For example, the redistrRange [0] described in Modified Example 19 corresponds to "redistributionFactorServing". The redistrRange [i] described in Modified Example 19 described above corresponds to "redistributionFactorFreq" or "redistributionFactorCell".

First, upon receiving the redistribution parameter, the UE 100 may disregard the absolute priority broadcast by the system information from the current serving cell. The UE 100 may perform the reselection of the target cell toward the cell in target frequency based on the redistribution parameter.

In such a case, similar to Modified Example 5 and Modified Example 20, the UE 100 may activate the predetermined timer (T360) in response to the reselection of the target cell and use the cell in target frequency as the target cell during the activation of the predetermined timer. The UE 100 may disregard the absolute priority and perform the reselection of the target cell toward the cell in target frequency based on the redistribution parameters after the expiration of the predetermined timer. When the information element indicating that the reselection of the target cell is performed only by the reselection request signal (refer to Modified Example 7) included in the paging signal is included in the system information, the UE 100 may perform the reselection of the target cell based on the absolute priority broadcast by the system information in the state after the predetermined timer expires or the state in which the predetermined is being activated.

Second, even when the absolute priority is broadcasted by the system information, if the UE 100 receives the redistribution parameters, the UE 100 may perform the reselection of the target cell toward the cell in target frequency based on the redistribution parameters.

The UE 100 may perform the reselection of the target cell toward the cell in target frequency based on the redistribution parameters under the condition that the predetermined timer (T360) is not being activated or the predetermined timer expires. The UE 100 may perform the reselection of the target cell toward the cell in target frequency based on the redistribution parameters under the condition that the information element (for example, redistrOnPagingOnly) indicating that the reselection of the target cell is performed only by the reselection request signal (refer to Modified Example 7) included in the paging signal is not included in the system information.

The UE 100 may perform the reselection of the target cell toward the cell in target frequency based on the redistribution parameters under the condition that the paging signal is received and the received paging signal includes the reselection request signal.

In such a case, similar to Modified Example 5 and Modified Example 20, the UE 100 may activate the predetermined timer (T360) in response to the reselection of the target cell and use the cell in target frequency as the target cell during the activation of the predetermined timer. Even when the absolute priority is broadcasted by the system information, the UE 100 may perform the reselection of the target cell toward the cell in target frequency based on the redistribution parameters after the expiration of the predetermined timer. When the information element indicating that the reselection of the target cell is performed only by the reselection request signal included in the paging signal is included in the system information, the UE 100 may perform the reselection of the target cell based on the absolute priority broadcast by the system information in the state in which the predetermined timer expires or the state in which the predetermined timer is not being activated, when the information element indicating that the reselection of the target cell is performed only by the reselection request signal included in the paging signal is included in the system information.

Other Embodiments

Although the present invention has been described with reference to the above-mentioned embodiments, it should not be understood that the description and drawings configuring a part of this disclosure limit the present invention. From this disclosure, various alternative embodiments, Examples and operational techniques will be apparent to those skilled in the art.

Although not specifically mentioned in the embodiment, the quality measurement of the neighboring cells as the target cell is selected may be started when the predetermined condition is satisfied at predetermined timing (embodiment). Alternatively, a selection (Modified Example 1) of a target cell based on values having randomness may be performed when the predetermined condition is satisfied. For example, the predetermined condition may be that an access class of a UE 100 is an access class notified from a current serving cell. The predetermined condition may be that the frequency priority modAC=0 is satisfied, or the cell-IDmodAC=0 is satisfied.

As described in the embodiment, as the whole procedure for selecting a target cell, there are (A) a procedure (measurement procedure) of measuring quality of neighboring cells adjacent to the current serving cell when the start conditions are satisfied, and (B) a procedure (selection procedure) of selecting a target cell to be used as a serving cell from cells satisfying the selection condition. The embodiment relates to the measurement procedure, and Modified Examples 1 to 3 relate to the selection procedure. In such a case, the measurement procedure according to the embodiment may be combined with the selection procedure according to any one of Modified Examples 1 to 3. The selection procedures according to two or more Modified Examples selected from Modified Examples 1 to 3 may be combined.

In Modified Example 4, in order that the current serving cell triggers an operation of selecting a target cell to the UE 100 in response to a reference trigger notification that is any one of a plurality of trigger notifications, a case in which a counter included in the UE 100 and a counter value included in the trigger notification are used is exemplified. However, Modified Example 4 is not limited thereto. Specifically, it is preferable for the UE 100 to trigger an operation of selecting a target cell according to any one (reference trigger notification) of trigger notifications notified from the current serving cell plural times within a certain period of time. Therefore, even when the UE 100 activates the timer according to the trigger (or execution or start, the same hereinafter) of the operation of selecting the target cell and receives the trigger notification until the timer expires, the UE 100 may be configured not to trigger the operation of selecting the target cell. It is preferable that the time from the activation of the timer to the expiration of the timer is substantially the same as the period during which the trigger notification is notified plural times (the fixed period described above). Each of the plurality of trigger notifications includes toggle information acquiring two or more values, and the UE 100 (controller) may store the toggle information included in the reference trigger in the storage area when triggering the operation of selecting the target cell according to the reference trigger notification. In such a case, when the toggle information included in the trigger notification broadcast from the current serving cell matches the toggle information stored in the storage area, the UE 100 (controller) does not trigger the operation of selecting the target cell. When the toggle information included in the trigger notification broadcast from the current serving cell does not match the toggle information stored in the storage area, the UE 100 (controller) triggers the operation of selecting the target cell.

Although not specifically mentioned in the embodiment, the cell (hereinafter, overload cell) that transmits the trigger notification such as the parameter for urging the reselection of the target cell or the reselection request signal requesting the reselection of the target cell may be treated as follows. Specifically, the UE 100 may exclude overload cells from the cell to be measured The UE 100 may exclude the overload cells from the target cell used as the serving cell even when the overload cell satisfies the criteria ("S-criteria") that the neighboring cell should satisfy. The UE 100 may exclude the overload cell from the cell that provides the ranking. Thereby, the ping-pong effect in which the UE 100 alternately selects these neighboring cells as the target cells in a state in which a plurality of neighboring cells is transmitting a trigger notification (for example, a state in which all of a plurality of neighboring cells are a high load) is suppressed.

Although not specifically mentioned in the embodiment, when the condition that the elapsed time after being located in the current serving cell exceeds the prohibition time threshold value (for example, 1 second) is satisfied, the UE 100 may perform the reselection of the target cell. Under such a premise, when the reselection of the target cell is performed according to the above-mentioned trigger notification, it is preferable that the UE 100 uses the time threshold value longer than the time threshold value used in the case in which the reselection of the target cell is performed according to the above-mentioned start condition A1 or A2. Thereby, the ping-pong effect in which the UE 100 alternately selects these neighboring cells as the target cells in a state in which the plurality of neighboring cells is transmitting a trigger notification (for example, a state in which all of a plurality of neighboring cells are a high load) is suppressed. From the same point of view, when the UE 100 performs the reselection of the target cell in response to the above-mentioned trigger notification, it is preferable to use the predetermined period (Treselection$_{RAT}$) longer than the predetermined period (Treselection$_{RAT}$) used in the case in which the UE 100 performs the reselection of the target cell according to the above-mentioned start condition A1 or A2.

In the embodiment and Modified Examples, the priority (cellReselectionPriority) may be regarded as the priority allocated to the frequency of the cell or may be regarded as the priority allocated to the cell. For example, the priority (cellReselectionPriority) may be the priority of the inter-frequency or the priority of the inter-RATfrequency cell.

Although not specifically mentioned in Modified Examples 20 to 22, the method of reselecting a target cell is not particularly limited, and may be the method described in the embodiment or another Modified Example.

Although not specifically mentioned in the embodiment, a program for allowing a computer to execute each processing performed by the UE 100 and the eNB 200 may be provided. The program may be recorded on a computer readable medium. It is possible to install a program in a computer by using the computer readable medium. The computer readable medium on which the program is recorded may be a non-transitory recording medium. The non-transitory recording medium is not particularly limited, but may be recording media such as a CD-ROM and a DVD-ROM.

A chip configured by a memory that stores a program for executing each process performed by the UE 100 and the eNB 200 and a processor that executes the program stored in the memory may be provided.

In the embodiment, an LTE system has been described as an example of the mobile communication system. However, the embodiment is not limited thereto. The mobile communication system may be a system other than the LTE system.

SUPPLEMENTARY NOTE

1. Introduction

In RAN#93bis, the issue on ambiguity after timer T360 expiry was identified. In this supplementary note, it's discussed to revisit the issue and how to capture the UE behaviour agreed.

2. Discussion 2.1. Scenario

The issue pointed out in was how the UE behaves upon T360 expiry, if both the absolute priority and the redistribution parameter are provided. It was agreed as the expected UE behaviour that "in the scenario described the UE should not move to F1 on T360 expiry before redistribution is complete". It could be also said that upon T360 expiry, the UE (re-)performs the E-UTRAN Inter-frequency Redistribution procedure, whenever the redistribution parameters are provided in SIB of the serving cell.

Observation 1: Upon T360 expiry, the UE (re-)performs the E-UTRAN Inter-frequency Redistribution procedure.

On the other hand, there is the same issue around the start of T360 timer, i.e., when the redistribution parameter is initially provided at an SI modification boundary. For example, it's possible that the serving cell starts to provide the redistribution parameter in addition to the absolute priority, in its SIB.

Observation 2: Prior to the start of T360 timer, if the redistribution parameters become available at an SI modification boundary, the UE should also perform the E-UTRAN inter-frequency redistribution procedure.

Of course, some smart eNB implementation may try to avoid the conditions stated in the above observations. However, if the solution is to fix the ambiguity within the specification, the solution should be applicable to both conditions at T360 expiry and at the start of T360. In this sense, the issue could be reworded in general, which broadcast parameter should be prioritized, the absolute priority or the redistribution parameters, if both parameters are provided in SIB of the serving cell. And the expected UE behaviour was already agreed as mentioned above.

Confirmation 1: The solution should clarify the UE behaviour that the E-UTRAN Inter-frequency Redistribution procedure is prioritized over the broadcasted absolute priority whenever the redistribution parameter is provided in SIB of the serving cell.

2.2. CR Options

The options were already suggested.

1) leave it to UE implementation.

2) Specify that UE should have completed the measurements before the timer T360 expires so it can apply the re-prioritisation immediately.

3) Allow the UE to always re-select to the previous highest frequency before reapplying the re-distribution procedure.

Although Option 1) seems to be a reasonable solution, the expected UE behaviour from Confirmation 1 cannot be captured in the specification. Option 2) works only for the scenario of T360 expiry. Option 3) is not aligned with the expected UE behaviour agreed. Therefore, additional solutions should be further considered to agreement in Confirmation 1.

Proposal 1: RAN2 should discuss how to specify the agreed UE behaviour to prioritize the E-UTRAN Inter-frequency Redistribution procedure.

2.2.1. Solution in Reselection Priorities Handling

The issue may be fixed in Reselection priorities handling as follows.

"5.2.4.1 Reselection priorities handling. Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signalling or the redistribution parameter is provided, the UE shall ignore all the priorities provided in system information. If UE is in camped on any cell state, UE shall only apply the priorities provided by system information from current cell, and the UE preserves priorities provided by dedicated signalling and deprioritisationReq received in RRCConnectionReject unless specified otherwise. When the UE in camped normally state, has only dedicated priorities other than for the current frequency, the UE shall consider the current frequency to be the lowest priority frequency (i.e. lower than any of the network configured values). While the UE is camped on a suitable CSG cell, the UE shall always consider the current frequency to be the highest priority frequency (i.e. higher than any of the network configured values), irrespective of any other priority value allocated to this frequency if that cell can be accessed in normal coverage. If the UE capable of sidelink communication is configured to perform sidelink communication and can only perform the sidelink communication while camping on a frequency, the UE may consider that frequency to be the highest priority. NOTE: The prioritization among the frequencies which UE considers to be the highest priority frequency is left to UE implementation."

2.2.2. Solution in E-UTRAN Inter-Frequency Redistribution Procedure

The issue may also be fixed in E-UTRAN Inter-frequency Redistribution procedure as follows.

"5.2.4.10 E-UTRAN Inter-frequency Redistribution procedure. Even if cellReselectionPriority(s) is provided in SystemInformationBlockType3 and/or SystemInformationBlockType5, if a UE is redistribution capable and redistributionServingInfo is included in SystemInformationBlockType3 and redistributionInterFreqInfo is included in SystemInformationBlockType5 and the UE is not configured with dedicated priorities and if T360 is not running and if redistrOnPagingOnly is not present in SystemInformationBlockType3; or if T360 expires and if redistrOnPagingOnly is not present in SystemInformationBlockType3; or if Paging message is received and redistributionIndication is included:

Perform inter-frequency measurement as specified in 5.2.4.2;

Once measurement results are available perform redistribution target selection as specified in 5.2.4.10.1;

Start T360.

The UE shall stop T360 and cease to consider a frequency or cell to be redistribution target when:

the UE enters RRC CONNECTED state; or

T360 expires; or if Paging message is received and redistributionIndication is included while T360 is running; or the UE reselects a cell not belonging to redistribution target."

Proposal 2: RAN2 should decide which of the two solutions (clarification within Reselection priorities handling or E-UTRAN Inter-frequency Redistribution procedure) should be adopted.

3. Conclusion

In this supplementary note, the issues on ambiguity after timer T360 expiry is generalized for the condition where the absolute priority and the redistribution parameter are broadcasted. The additional solutions to fix the extended issue are provided.

INDUSTRIAL APPLICABILITY

The present invention is useful in a communication field.

The invention claimed is:

1. A user terminal, comprising:
    a controller configured to select a target cell as a serving cell from a plurality of cells operated at different frequencies; and
    a receiver configured to receive a redistribution parameter and an absolute priority as a reselection parameter broadcast by the serving cell, the absolute priority being Cell Reselection Priority, wherein
    the controller is further configured to perform:
        first processing of performing a reselection of the target call toward a cell in target frequency based on the redistribution parameter and activating a predetermined timer, the predetermined timer being T360;
        second processing of using a cell selected by the first processing as the target cell during the activation of the predetermined timer;
        third processing of, in response to an expiration of the predetermined timer, performing selection procedure of the target cell not based on the absolute priority, the selection procedure including measurement of neighbor cell and the reselection of the target cell toward the cell in the target frequency based on the redistribution parameter; and
        forth processing of performing the reselection of the target cell based on the absolute priority in response to the expiration of the predetermined timer if system information broadcasted from the serving cell includes information element to indicates that the user terminal will be instructed to perform the reselection of the target cell only by paging signal transmitted from the serving cell.

2. The user terminal according to claim 1, wherein
    the controller is configured to perform the third processing under a condition that the information element is not included in the system information.

* * * * *